US007620564B1

(12) United States Patent
Lippock

(10) Patent No.: US 7,620,564 B1
(45) Date of Patent: Nov. 17, 2009

(54) SALES TERRITORY PLANNING TOOL AND METHOD

(75) Inventor: Steven A. Lippock, Harrison City, PA (US)

(73) Assignee: HarvestGold, Harrison City, PA (US)

( * ) Notice: Subject to any disclaimer, the term of this patent is extended or adjusted under 35 U.S.C. 154(b) by 1254 days.

(21) Appl. No.: 10/915,964

(22) Filed: Aug. 11, 2004

(51) Int. Cl.
*G06F 17/30* (2006.01)
(52) U.S. Cl. ....................................................... 705/10
(58) Field of Classification Search .................... 705/10
See application file for complete search history.

(56) References Cited

U.S. PATENT DOCUMENTS

| | | | |
|---|---|---|---|
| 4,853,852 A | 8/1989 | Rosen | |
| 5,666,493 A | 9/1997 | Wojcik et al. | |
| 5,737,726 A | 4/1998 | Cameron et al. | |
| 5,930,764 A | 7/1999 | Melchione et al. | |
| 5,966,695 A | 10/1999 | Melchione et al. | |
| 5,991,733 A | 11/1999 | Aleia et al. | |
| 6,061,506 A | 5/2000 | Wollaston et al. | |
| 6,067,525 A | 5/2000 | Johnson et al. | |
| 6,236,977 B1 | 5/2001 | Verba et al. | |
| 6,442,567 B1 | 8/2002 | Retallick et al. | |
| 7,092,929 B1* | 8/2006 | Dvorak et al. | 705/28 |
| 7,340,410 B1* | 3/2008 | Vaillancourt et al. | 705/10 |
| 2003/0033195 A1* | 2/2003 | Bruce et al. | 705/10 |

FOREIGN PATENT DOCUMENTS

JP 08278889 A 10/1996

OTHER PUBLICATIONS

Zoltners, Andris A.; Sinha, Prabhakant. "Sales Territory Alignment: A Review and Model". Nov. 1983. Management Science. vol. 29, No. 11. pp. 1237-1256.*

Babakus, Emin; Cravens, David W.; Grant, Ken; Ingram, Thomas N.; LaForge, Raymond W.; "Investigating the Relationships Among Sales, Management Control, Sales Territory Design, Salesperson Performance and Sales Organization Effectiveness". 1996. International Journal of Research in Marketing. vol. 13. pp. 345-363.*

(Continued)

*Primary Examiner*—Jonathan G. Sterrett
*Assistant Examiner*—Peter Choi
(74) *Attorney, Agent, or Firm*—Cohen & Grigsby, P.C.

(57) ABSTRACT

A method for making and organizing a sales territory plan includes guiding users through the development of sales goals, strategies, and targeted lists of accounts derived from the quantifiable characteristics. Historical sales data and strategy are reviewed to define a sales record, which is then segmented based upon commonalties and categorized. The segmented record is analyzed by individual sales territory to create a territory dashboard from which trends and relationships are then evaluated. These trends and relationships are further analyzed using a territory strategies analysis for planning sales strategies based on account segments, sales goals, and other relevant criteria, and to establish a tactical sales action plan. A system and computer process implement one or more steps of the method for territory analysis, goal setting, and strategy and tactics development. In order to derive further benefit execution and follow-up steps are also conducted.

18 Claims, 39 Drawing Sheets

Putting it All Together

OTHER PUBLICATIONS

Wolfram, Eric. "How To: Sell: Cold Calling". retrived from <httpL//wolfram.org/writing/howto/sell/cold_call.html> archived Jul. 1, 2003.*

Harrison, Craig. "Warming Up . . . To Cold Calls". HSMAI Magazine. Fall 2001.*

Siegel, Art. "The Art of Telephone Cold Call Timing". retrived from <http://www.salesmba.com/articles1/slpr02.htm> archived Dec. 28, 2002.*

* cited by examiner

Summary of HG Process

| Process | Analysis | Goal Setting | Strategy | Tactics | Execution and Follow-up |
|---|---|---|---|---|---|
| Activities | • Review Data Analysis with sales manager | • Answer Goal Setting Questions<br>• Compare resulting personal goals to company goals<br>• Define key metrics | • Identify best growth opportunities<br>• Define strategic approach | • Develop short list of accounts<br>• Map accounts<br>• Define account level sales strategies<br>• Define next action items | • Track key metrics<br>• Conduct regular Territory Plan reviews between sales reps and mgrs<br>• Hold sales people accountable for hitting goals |
| Tools | • Spreadsheet Template for data collection and analysis<br>• Data import tool | • Goal setting questionnaire<br>• Active customer segmentation template | • Strategy development template | • Focus list template<br>• Competitive summary template<br>• Optional: MapPoint software | • Sales Management report templates<br>• Territory Plan review template<br>• Performance review template<br>• Personal Goals template<br>• Resource Request template |
| Output | • Dashboard Analysis in areas of Customer Analysis, Product Analysis and Channel Analysis | • Results Summary outlining both activity and productivity goals | • 3 to 5 key strategy scenarios and associated sales goals | • List of targeted accounts<br>• Overview of competition<br>• Territory map highlighting targeted accounts | • Final documented plan ready for approval |

Agenda                        Business Overview

Figure 2

Data Management

View and Edit Product Data

| Product Name | Product Type | Product Category | Manufacturer |
|---|---|---|---|
| Aberdeen Snell | Fishing Equipment | Hooks | Eagle Claw |
| Aglia Original Dressed | Fishing Equipment | Lures | Mepps |
| Aglia Original Plain | Fishing Equipment | Lures | Mepps |
| Avid Series | Fishing Equipment | Rod | St. Croix |
| Baitholder | Fishing Equipment | Hooks | Bass Pro |
| Baitrunner Spinning Reel | Fishing Equipment | Reel | Shimano |
| Bass Fishing Lesson | Services | Fishing Lesson | Denny Brauer |
| BassTender | Boats | Bass Boat | Leisure Life |
| Black Gold | Fishing Equipment | Reel | Daiwa |
| Bone-Dry Neoprene Chest | Fishing Equipment | Waders | RedHead |
| Breathable Chest Waders | Fishing Equipment | Waders | White River |
| Calcutta Saltwater Baitcast | Fishing Equipment | Reel | Shimano |
| Charter Fishing - Bass | Services | Half Day Charter | Blue Lagoon Charter Flee |
| Charter Fishing - Deep Sea | Services | Full Day Charter | Deep Sea Charter |
| Charter Fishing - Steelhead | Services | Half Day Charter | Steve Lippock |
| Charter Fishing - Walleye | Services | Full Day Charter | The Minnow Charter Boat |
| Comet Mino | Fishing Equipment | Lures | Mepps |
| Compre Graphite Rod | Fishing Equipment | Rod | Shimano |
| CountDown | Fishing Equipment | Lures | Rapala |
| Criterion Spinning Reel | Fishing Equipment | Reel | Pflueger |

Figure 3c

View and Edit Sales Data

| Customer Name | Product Name | Sales Value | Order Count | Quantity Ordered | Period Name | Channel Name |
|---|---|---|---|---|---|---|
| Boat World | Pro Team 185 | $74,165 | 2 | 7 | 2003 | Direct |
| Watersports Warehouse | Pro Team 185 | $21,190 | 2 | 2 | 2003 | Direct |
| Boat World | Flash | $18,000 | 2 | 30 | 2003 | Direct |
| Boat World | Pairadise | $16,498 | 2 | 30 | 2003 | Direct |
| Boat World | Splash | $15,000 | 2 | 30 | 2003 | Direct |
| Boat World | Endeavor | $14,800 | 2 | 40 | 2003 | Direct |
| Boat World | Viper | $12,000 | 2 | 40 | 2003 | Direct |
| Boat World | BassTender | $11,192 | 2 | 8 | 2003 | Direct |
| Fisherman's Kingdom | Pro Team 185 | $10,595 | 1 | 1 | 2003 | Direct |
| Tommy Maddox | Pro Team 185 | $10,595 | 1 | 1 | 2003 | Direct |

| Customer Name | Account Type | Region | Date Acq | Territory |
|---|---|---|---|---|
| Angler Catalog | Distributor | default | B | |
| Big Catch Tackle | Retail | default | B | |
| Boat World | Retail | default | A | |
| Charter Distributors | Distributor | default | A | |
| Dicks Sporting Goods | Retail | default | B | |
| Donald Trump | Consumer | default | C | |
| Fisherman's Kingdom | Retail | default | A | |
| Fishing SuperStore | Retail | default | B | |
| Fishing Supply Warehouse | Distributor | default | A | |

Figure 3d

*Analysis*

Customer Dashboard

Account Segmentation

Product Analysis

| Product Type | Product Category | Name | Sales $ | Sales % | Customer % | Customer Count | Avg Ord Size | Sales/Customer | Orders/Year |
|---|---|---|---|---|---|---|---|---|---|
| Fishing Equipmen | Reel | Baitrunner Spi | $27,897.00 | 2.67% | 48.57% | 17 | 871.78 | 1,641.00 | 32 |
| Fishing Equipmen | Hooks | XPS | $27,662.00 | 2.65% | 54.29% | 19 | 768.39 | 1,455.89 | 36 |
| Boats | Kayak | Endeavor | $27,010.00 | 2.59% | 17.14% | 6 | 3,376.25 | 4,501.67 | 8 |
| Fishing Equipmen | Rod | Avid Series | $26,699.00 | 2.56% | 54.29% | 19 | 861.26 | 1,405.21 | 31 |
| Fishing Equipmen | Waders | Breathable C | $26,472.00 | 2.54% | 37.14% | 13 | 1,018.15 | 2,036.31 | 26 |
| Fishing Equipmen | Reel | Calcutta Salt | $24,600.00 | 2.36% | 25.71% | 9 | 1,537.50 | 2,733.33 | 16 |
| Fishing Equipmen | Rod | Ugly Stik | $23,044.00 | 2.21% | 57.14% | 20 | 677.76 | 1,152.20 | 34 |
| Fishing Equipmen | Waders | Bone-Dry Neo | $22,850.00 | 2.19% | 42.86% | 15 | 761.67 | 1,523.33 | 30 |
| Boats | Kayak | Viper | $22,800.00 | 2.18% | 17.14% | 6 | 2,533.33 | 3,800.00 | 9 |
| Fishing Equipmen | Line | Fluorocarbon | $22,332.00 | 2.14% | 54.29% | 19 | 620.33 | 1,175.37 | 36 |
| Fishing Equipmen | Line | Trophy Monofi | $22,332.00 | 2.14% | 54.29% | 19 | 620.33 | 1,175.37 | 36 |
| Fishing Equipmen | Hooks | Mega Lite | $22,100.00 | 2.12% | 54.29% | 19 | 631.43 | 1,163.16 | 35 |
| Fishing Equipmen | Reel | Pro Qualifier | $22,000.00 | 2.11% | 57.14% | 20 | 611.11 | 1,100.00 | 36 |
| Boats | Kayak | Critter | $21,297.00 | 2.04% | 17.14% | 6 | 2,366.33 | 3,549.50 | 9 |
| Fishing Equipmen | Reel | Regal Z Spinn | $20,160.00 | 1.93% | 51.43% | 18 | 592.94 | 1,120.00 | 34 |
| Fishing Equipmen | Line | Premium Monofilament (4 to 17 lb) | | | 54.29% | 19 | 558.14 | 1,057.53 | 36 |
| Fishing Equipmen | Reel | Supreme Spin | $19,485.00 | 1.87% | 51.43% | 18 | 573.09 | 1,082.50 | 34 |
| Fishing Equipmen | Hooks | Boltholder | $19,363.00 | 1.86% | 54.29% | 19 | 537.86 | 1,019.11 | 36 |
| Boats | Kayak | Paradise | $19,248.00 | 1.84% | 5.71% | 2 | 6,416.00 | 9,624.00 | 3 |
| Boats | Bass Bo | BassTender | $18,187.00 | 1.74% | 11.43% | 4 | 3,031.17 | 4,546.75 | 6 |
| Fishing Equipmen | Line | Magnathin [4 | $17,857.00 | 1.71% | 54.29% | 19 | 496.03 | 939.84 | 36 |
| Fishing Equipmen | Reel | Johnny Morris | $17,640.00 | 1.69% | 31.43% | 11 | 1,037.65 | 1,603.64 | 17 |

Figure 4c

Goal Setting

Forecasting Sales from Existing Accounts

Answer Goal Setting Questions

Figure 6d

Strategies

List of Developed Strategies

Creating a Strategy: Choose Products and Services to sell by dragging and dropping Creating a Strategy: Target Accounts by type, classification, products purchased, products not purchased and channels purchased through Creating a Strategy: Make final adjustments to the Strategy Scenario

Figure 8b

| Strategy Information | | | | | |
|---|---|---|---|---|---|
| Strategy Name: | Sell Inflatable Boats to Retail Customers | | | | |
| # of Accounts Targeted: 16 | % Of Total Sales Objective: 0.00% | | Projected Sales For This Strategy: $0.00 | | |

Describe Your Problem/Opportunity | Choose Product To Sell | Choose Channel To Sell Through | Target Your Accounts | Final Adjustments

Products To Sell

| Name | Product/ServiceType | Category | Manufacturer/Service Provider |
|---|---|---|---|
| Cadet | Boats | Inflatable Boat | Zodiak |
| Yachtline | Boats | Inflatable Boat | Zodiak |

Products

| Name | Product/ServiceType | Category | Manufacturer/Service Provider |
|---|---|---|---|
| Aberdeen Snell | Fishing Equipment | Hooks | Eagle Claw |
| Aglia Original Dressed | Fishing Equipment | Lures | Mepps |
| Aglia Original Plain | Fishing Equipment | Lures | Mepps |
| Avid Series | Fishing Equipment | Rod | St. Croix |
| Baitholder | Fishing Equipment | Hooks | Bass Pro |
| Baitrunner Spinning Reel | Fishing Equipment | Reel | Shimano |
| Bass Fishing Lesson | Services | Fishing Lesson | Denny Brauer |
| Bass Fishing Trip to Okechobee | Services | Fishing Trip | John Anglerep |
| BassTender | Boats | Bass Boat | Leisure Life |
| Black Gold | Fishing Equipment | Reel | Daiwa |
| Bone Fishing in Mexico | Services | Fishing Trip | John Anglerep |
| Bone-Dry Neoprene Chest Waders | Fishing Equipment | Waders | RedHead |

Figure 8c

Tactics

Generate Targeted Account Lists by Strategy:
Export list to Excel for Management Reporting and Follow-Up

Execution

Document and Submit Resource Requests as part of the Sales Plan

Follow Up

Track Progress Against Goals

Figure 10a

Sales Plan/Strategy Review Template – Export to Excel for easy delivery

Figure 10b

*Administrative*

Excel Export Options

Metrics Worksheet

*In this worksheet, you define the metrics that you will use throughout the HarvestGold Territory Planning Process. The metrics you choose will depend on the goals for your organization (e.g., new market penetration, increased profitability or growth). The metrics must also be measurable.*

*After you have defined your metrics, you will rank them in order of importance.*

Examples

*Example #1: New Market Penetration*

|  | Definition of Success | Key Productivity Metrics |
|---|---|---|
| Company | New Market Penetration | % Market Share |
| Sales Organization | New Customer Acquisition | New Customers Acquired |
| Sales Rep | Income | Revenue from New Sales |

*Example #2: Increase in Profitability*

|  | Definition of Success | Key Productivity Metrics |
|---|---|---|
| Company | Increase in Profitability | Net Profits |
| Sales Organization | Increase Gross Margin | Average Margin |
| Sales Rep | Income | Average Sale Price |

*Example #3: Growth*

|  | Definition of Success | Key Productivity Metrics |
|---|---|---|
| Company | Growth | Total Revenue |
| Sales Organization | Increase in Sales | Sales Revenue |
| Sales Rep | Income | Sales Bookings |

Your Company

|  | Definition of Success | Key Productivity Metrics |
|---|---|---|
| Company |  |  |
| Sales Organization |  |  |
| Sales Rep |  |  |

Figure 12

*Which activities most directly impact the success of your reps?*
*(Rank them in order of impact and measurability)*

| Activity | Rank |
|---|---|
| Phone Calls | |
| Appointments | |
| Demonstrations | |
| Proposals | |
| | |
| | |

Figure 12 Continued

 Segmentation Worksheet

*This worksheet allows you to analyze your sales data according to various criteria. You can segment your sales by accounts, products and services, channels or other criteria that are relevant to your business. Identifying these segments is a key activity of the territory planning process.*

Accounts

You may segment accounts based on sales, account type, industry or other criteria.

Segment Accounts by Sales

How do you define your "A," "B" or "C" accounts? One option is to define them by sales dollars. In the following table, define sales ranges for your company's "A," "B" or "C" accounts. You may also define a sales range for accounts that fall beneath the C sales range ("other").

| | Sales Range | |
|---|---|---|
| | Minimum | Maximum |
| A | $ 75,000.00 | $ |
| B | $ 10,000.00 | $ 74,999.00 |
| C | $ 1,000.00 | $ 9,999.00 |
| Other | $ 1.00 | $ 999.00 |

Segment Accounts by Industry, Account Type or Other Criteria

How do you segment the accounts in your territory? You may choose to segment your accounts by account type (e.g., commercial, government, education, etc.), by industry (e.g., pharmaceutical, biotech, medical, etc.) or other criteria that is specific to your company.

Fill in the following table with your five top account segment categories. You may find it helpful to refer to your HG Company Questionnaire if you completed it in advance of the workshop.

*Important: The categories you select must be assigned in your legacy database, otherwise, the categories will not be reportable. You cannot manage what you cannot measure.*

Figure 13

| | Your Account Categories | Example 1 By Account Type | Example 2 By Industry Type |
|---|---|---|---|
| 1 | Account Category 1 | Commercial Accounts | Pharmaceutical |
| 2 | Account Category 2 | Government Accounts | Biotech |
| 3 | Account Category 3 | Education Accounts | Medical |
| 4 | | | Data Centers |
| 5 | | | Others |

Products and Services

How do you categorize your product and service offerings? Options for segmenting your product/service categories can include product types, business units, or other criteria relevant to your business.

Fill in the table below with your five top product and services categories.

| | Your Product/Service Categories | Example 1 | Example 2 |
|---|---|---|---|
| 1 | Product/Service Category 1 | Products | Pre-Configured Products |
| 2 | Product/Service Category 2 | Implementation Services | Custom Configured Products |
| 3 | Product/Service Category 3 | Training | Services |
| 4 | | Consulting | |
| 5 | | | |

Channels

How do you categorize your sales channels? Things to consider:
-- Who gets credit for the sale?
-- How/where is the order taken?

Fill in the table below with your five top channel categories.

*Important:* Some organizations may not have channels clearly defined. The categories you select must be assigned in your legacy database, otherwise, the categories will not be reportable. You cannot manage what you cannot measure.

| | Your Channel Categories | Example 1 | Example 2 |
|---|---|---|---|
| 1 | Channel Category 1 | Direct | Field |
| 2 | Channel Category 2 | Distribution | Inside/Telephone |
| 3 | | Reseller | Internet |
| 4 | | Retail | Trade Shows |
| 5 | | | |

Figure 13 Continued

Territory Dashboard

*This worksheet segments your organization's business by customer category (A, B, or C), customer type or industry, and product categories. When the worksheet is filled out completely, it provides the information necessary for a sales representative to understand his or her territory at a glance.*

Figure 14

 Goal Setting Questionnaire

*In this worksheet, you enter information about specific strategies that you will use to reach your sales and compensation goals. From your answers to these questions, the Goals Summary Worksheet will automatically calculate the activities you must complete to reach your goals.*

*Based on your business goals, your questions may be different than those presented here. You should use this worksheet as an example, and modify the questions as appropriate for your organization.*

Input Questionnaire for Goal Setting Calculations

|   |   | This Year's Goal | Last Year's Result |
|---|---|---|---|
| 1. | Enter your base salary | | |
|    | What is you Total Compensation Goal for this year? | $100,000 | |
|    | This is how much commission you need to earn this year: | $100,000 | |
| 2. | What is your average commission rate? | 7% | |
|    | This is how much business you need to write in 2004: | $1,428,571 | |

| 3. | How much business are you forecasting to come from existing clients next year? | $ 100,000 |
|---|---|---|
|   | This is how much new business you have to generate: | $ 1,328,571 |

This is the percent of business you are forecasting to come from:

| Existing Clients | 7% |
|---|---|
| New Clients | 93% |
| Total (should be 100%) | 100% |

This means you need these groups to produce:

| Existing Clients | $ 100,000 |
|---|---|
| New Clients | $ 1,328,571 |
| Total | $ 1,428,571 |

| 4. | Telephone Activity (New Business) | |
|---|---|---|
|   | How many phone calls does it take to get an appointment with a new prospect? | 12 |
|   | Your success rate from cold calling is: | 8% |

Figure 15

5. Appointments

*Existing Clients*
    What percent of appointments with existing clients result in sales? `95%`

What percent of orders from existing clients require on site visits? `50%`

OR: How many times a year on average do you visit your existing customers? `12`

*New Accounts*
    How many new prospects do you have to meet with to get a new client? `3`

How many appointments with a new prospect does it take to close the first sale? `2`

This is the total number of appointments it takes with prospects to secure one new customer. `6`

This is your success rate (appointments with prospects that result in sales) `17%`

6. Average Order Sizes For Existing Customers:
    What is the average sale size? `$500`

How many orders do they place per year? `50`

7. Average Order Sizes for New Accounts:
    What is the average sale size? `$500`

How many orders will new clients place per year? `25`

Figure 15 Continued

Goals Summary Sheet

This worksheet presents the activities you must complete, and the rate or frequency with which you must complete them, to reach your sales goals. The specific activities listed on this worksheet are based on your answers to the Goal Setting Questionnaire.

Based on the metrics you select and your business goals, your activities may be different than those presented here. You should use this worksheet as an example, and modify the activity and productivity goals as appropriate for your organization.

|  | Annually | Quarterly | Monthly | Weekly | Daily |
|---|---|---|---|---|---|
| Commission Income Goal | $100,000 | $25,000 | $8,333 | $2,222 | $444 |
| *Assumes 45 productive weeks per year | | | | | |

Activity Goals

Activity Goal:
*Phone Calls*

|  | Annually | Quarterly | Monthly | Weekly | Daily |
|---|---|---|---|---|---|
| To prospective new customers | 3,826 | 957 | 319 | 80 | 16 |
| Value per phone call | $ 26 | $ 26 | $ 26 | $ 26 | $ 26 |

Activity Goal:
*Appointments*

|  | Annually | Quarterly | Monthly | Weekly | Daily |
|---|---|---|---|---|---|
| Existing customers | 0 | 0 | 0 | 0 | 0 |
| New customers (follow-up meetings) | 319 | 80 | 27 | 7 | 1 |
| New customers (1st meetings) | 319 | 80 | 27 | 7 | 1 |
| Total | 638 | 159 | 53 | 13 | 3 |

Productivity Goals

Productivity Goal:
*Number of Customers Sold*

|  | Annually | Quarterly | Monthly | Weekly | Daily |
|---|---|---|---|---|---|
| Existing customers | 4 | 1 | 0 | 0 | 0 |
| New customers | 106 | 27 | 9 | 2 | 0 |
| Total | 110 | 28 | 9 | 2 | 0 |

Productivity Goal:
*Sales Transactions/Orders*

|  | Annually | Quarterly | Monthly | Weekly | Daily |
|---|---|---|---|---|---|
| Existing customers | 200 | 50 | 17 | 4 | 1 |
| New customers | 2,657 | 664 | 77 | 55 | 11 |
| Total | 2,857 | 714 | 94 | 60 | 12 |

Productivity Goal:
*Sales Revenue*

|  | Annually | Quarterly | Monthly | Weekly | Daily |
|---|---|---|---|---|---|
| Existing customers | $ 100,000 | $ 25,000 | $ 8,333 | $ 2,083 | $ 417 |
| New customers | $ 1,328,571 | $ 332,143 | $ 110,714 | $ 27,679 | $ 5,536 |
| Total | $ 1,428,571 | $ 357,143 | $ 119,048 | $ 29,762 | $ 5,952 |

Sales Campaign Worksheet

*Allows you to define and plan your sales campaigns based on account segments, sales goals and other criteria.*

| Campaign Name/Description | Campaign Owner | Target Market(s) | List Source(s) | Number of Contacts |
|---|---|---|---|---|
| | | | | |
| | | | | |
| | | | | |
| | | | | |
| | | | | |
| | | | | |
| | | | | |

Territory Plan Review Form

*Presents goals and goal tracking over the plan period for both the sales manager's and sales representative's review.*

Plan Reviews

| Plan Reviews | Dates | Manager's Initials | TM's Initials |
|---|---|---|---|
| Initial plan review and approval | | | |
| First Quarterly review | | | |
| Second Quarterly review | | | |
| Third Quarterly review | | | |
| Fourth Quarterly review | | | |

Income Goals and Results

| 12 Month Income Goal | $ | | | |
|---|---|---|---|---|
| Quarterly Forecast | % of year | Goal | Actual | Percent of Goal |
| Q1 | | | | |
| Q2 | | | | |
| Q3 | | | | |
| Q4 | | | | |
| TOTAL | | | | |

Production Goals and Results

| Annual Sales Goal | $ | | | |
|---|---|---|---|---|
| Quarterly Forecast | % of year | Goal | Actual | Percent of Goal |

SALES TERRITORY PLANNING TOOL AND METHOD

CROSS-REFERENCE TO RELATED APPLICATIONS

[Not Applicable]

FEDERAL RESEARCH STATEMENT

[Not Applicable]

COMPUTER LISTING APPENDIX

This application includes a computer program listing appendix submitted on compact disc, which is hereby incorporated by reference.

FIELD OF THE INVENTION

The present invention relates to a system and method for making and organizing a sales territory plan and, more particularly, to a system and method for analyzing a sales territory and identifying growth opportunity from which to set sales goals and strategies and ultimately define a tactical action plan.

BACKGROUND OF INVENTION

Territory sales people traditionally use tactics such as cold calling by using an alphabetical listing of prospective clients to contact and also visiting prospective clients by planning geographic routes by zip code. Sales people are generally not business people and do not have a business mindset (i.e., good business analysis and planning skills). Oftentimes, they use high pressure sales tactics to win over clients, trying to win over anyone they can, not strategizing. This leads to disorganization and inefficiency in the sales people's territory activities and thus less sales revenue is reaped than what otherwise could be.

However, there are sales process solutions that help sales people identify the key steps, and activities within, so as to help the sales process stage progress from "Qualify Lead" to the "Closed" phase. Also, techniques have been taught to help sales people perform selling activities such as needs development, objection handling, probing, and closing, in the most effective way possible and in the most convincing manner. Sales methodologies exist to help sales people develop account-level management strategies for particularly complex sales. These sales training and sales process solutions (e.g., Miller Heiman, Sandler Sales, Dale Carnegie, Solution Selling, SPIN Selling, etc.) help sales people to maximize their effectiveness with each individual sales opportunity.

A key to sales productivity is strategy and organization, not high pressure sales tactics. There is a need to not only optimize the techniques of one sales person, but also the whole team of sales people for that company. Similarly, there is a need to maximize the effectiveness of the sales process on a holistic level to provide greater sales efficiency and productivity, focusing away from the inefficient, time consuming focus on each individual sales opportunity in connection with cold calling sales. In sum, there is a need for a structured sales planning process and for associated tools to assist sales people increase their sales efficiency and productivity.

SUMMARY OF INVENTION

The present invention, also referred to as the HarvestGold Process™, is an integrated solution that assists sales people, as a team or as individuals, increase their efficiency and productivity by presenting them with a defined framework with which to organize their sales data, set sales goals for the immediate and long-term future, develop a sales strategy with an analytical framework as a guide, define a tactical action plan for executing the strategy, and an execution of the territory sales-plan and follow-up.

In general the process comprises reviewing historical sales data and strategy to define a sales record, which is then segmented based upon commonalties and categorized; and analyzing the segmented record by individual sales territory to create a territory dashboard from which trends and relationships are then evaluated. These trends and relationships are further analyzed using a territory strategies worksheet (see FIG. 17 for an example of a paper or spreadsheet version as described here, see FIGS. 7a-d and 8a-e for an alternate example of a software embodiment employing this basic idea) for planning sales strategies based on account segments, sales goals, and other relevant criteria, to establish a tactical sales action plan. Optionally, the tactical sales action plan is put into force and follow-up on the ongoing results of the sales action plan is reviewed and necessary modifications are made to achieve the sales goals.

An advantage of the present invention is to provide a tangible, integrated solution for a structured sales planning process and tools to help aid sales people increase their sales efficiency and productivity. Another advantage is directed towards instilling business efficiency in the sales people of the company by providing them with a structured framework with which to think about, analyze, and otherwise examine their historical, present, and projected sales data. Projected sales data is determined by the use of historical and present sales data, including the amount of work required by the sales person, such as telephone calls and visits to clients, in order to secure a sale.

Having briefly described the present invention, these and other objects, features and advantages of the invention will become apparent by those skilled in the art from the following detailed description of the invention and the accompanying drawings.

BRIEF DESCRIPTION OF DRAWINGS

FIG. 2 is an embodiment of a summary of steps and substeps of the process.

FIGS. 3a-d are an example of screen shots used in a computer facilitated embodiment of a data management step in the process.

FIGS. 4a-c are an example of screen shots used in a computer facilitated embodiment of an analysis step in the process.

FIGS. 6a-e are another example of screen shots used in a computer facilitated embodiment of a goal setting step in the process.

Figure 8C:
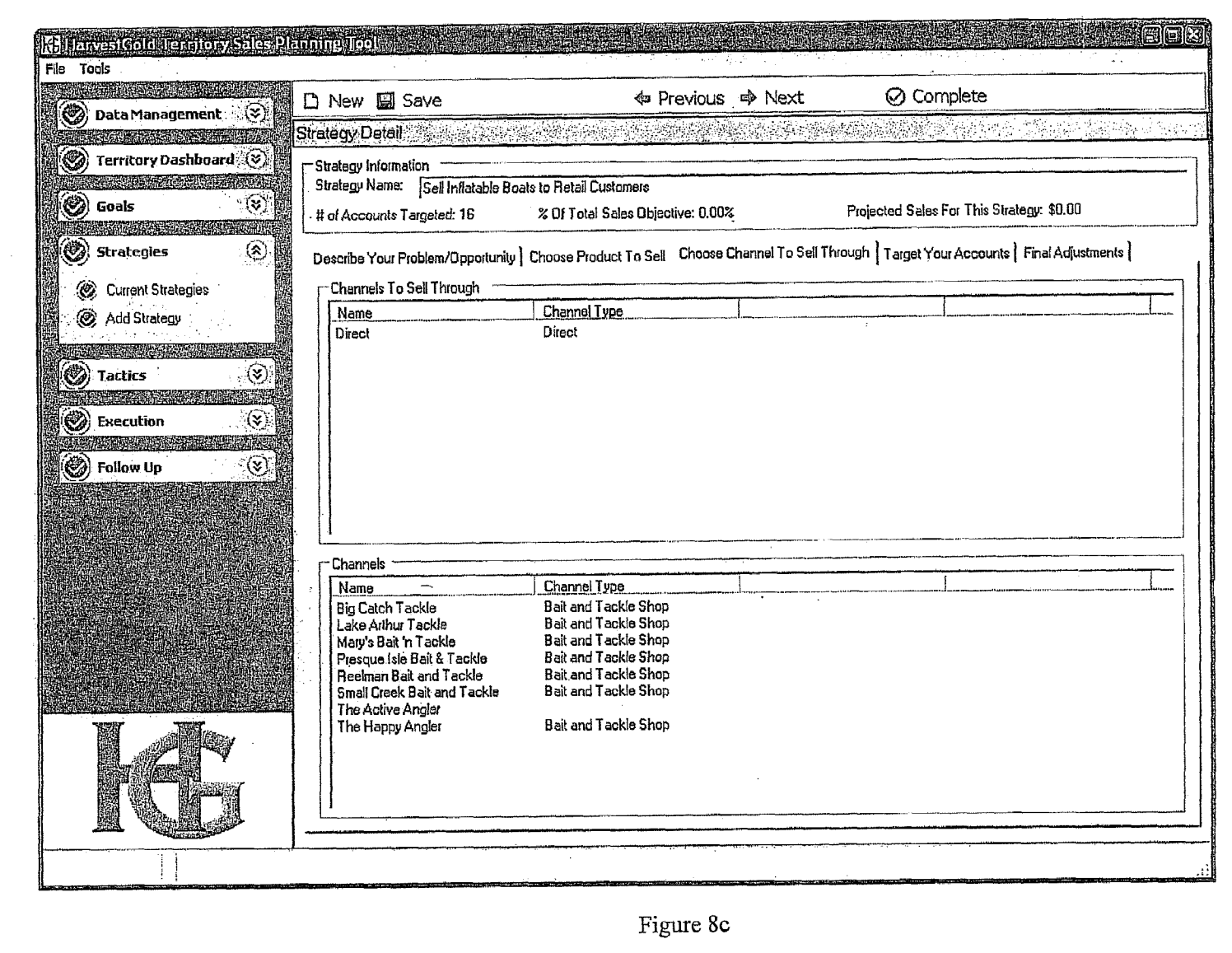

FIGS. 8a-e are another example of screen shots used in a computer facilitated embodiment of a strategies step in the process.

FIGS. 10*a* and *b* are an example of screen shots used in a computer facilitated embodiment of a follow-up step in the process.

FIG. 12 is an example of a metrics worksheet in a paper or spreadsheet version, which may also be embodied in software format.

FIG. 13 is a segmentation worksheet in a paper or spreadsheet version, which may also be embodied in software format.

FIG. 15 is a goal setting questionnaire embodied in a paper or spreadsheet version, which may also be embodied in software format.

FIG. 16 is a goal summary sheet embodied in a paper or spreadsheet version, which may also be embodied in software format.

FIG. 17 is a territory strategies worksheet embodied in a paper or spreadsheet version, which may also be embodied in software format.

FIG. 19 is a targeted account report embodied in a paper or spreadsheet version, which may also be embodied in software format.

FIG. 20 is a territory plan review form embodied in a paper or spreadsheet version, which may also be embodied in software format.

EXAMPLES OF EMBODIMENTS OF THE INVENTION

Figure 1:
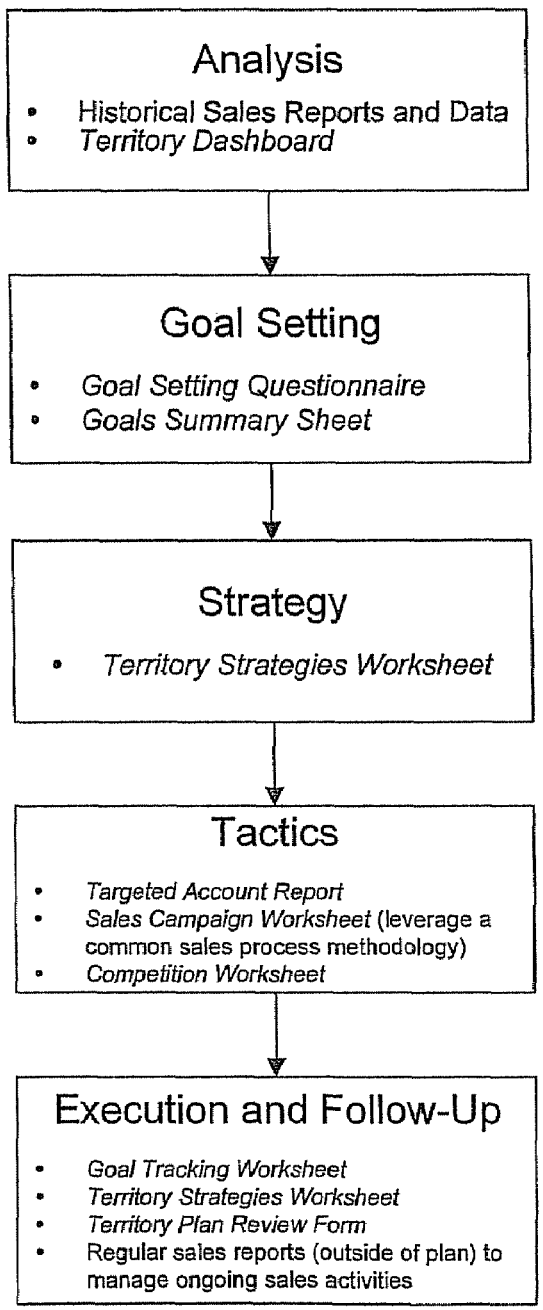
FIG. 1 is an overview of the process.

The method presented herein assists sales people, as a team or as individuals, to increase their efficiency and productivity through analyzing a sales territory and identifying growth opportunity from which to set sales goals and strategies and ultimately define a tactical action plan, overviews which are illustrated as FIGS. 1 and 2.

The method starts with an analysis of a company's business for the prior year to build a territory business plan. The company may be of any size or constitute an individual sole proprietor. Historical facts about the company business are reviewed on a regular basis or for a certain time period so that users understand the characteristics of their sales territories in several different categories. Users of the process can be anyone interested in improving their sales strategies including, for example, company individuals, such as executives or sales persons, or groups or committees of company individuals. Independent representatives may need to develop a system to record and maintain historical sales data on their own.

In an example of a first step, the user or sales people start by reviewing the sales situation and sales strategy by examining from either summary sales data from CRM (customer relationship management) systems, SFA (sales force automation) systems, or the functional equivalent thereof, or from transactional data in back-end order processing or account systems.

Figures 3A, 3B:
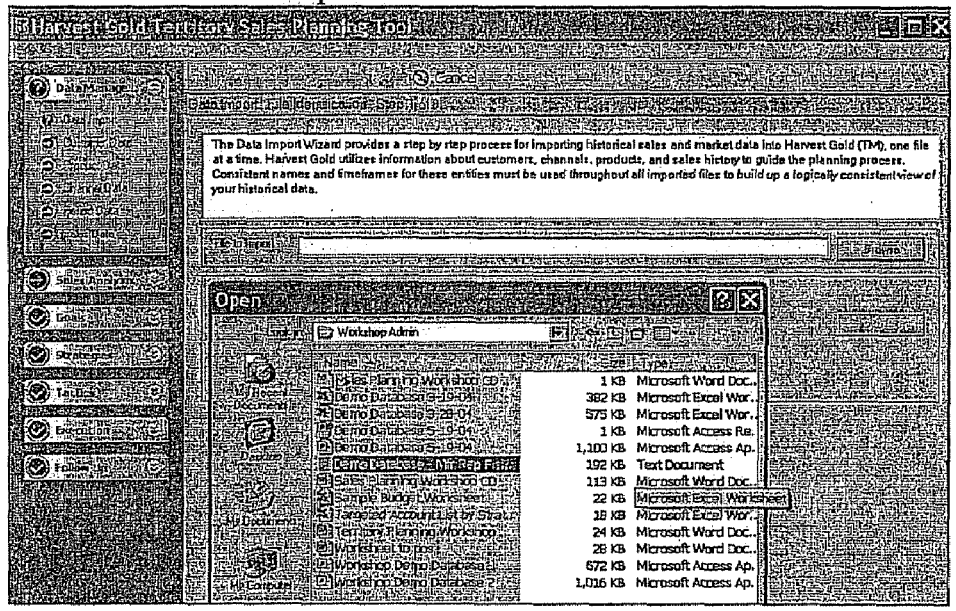
Figure 4A:
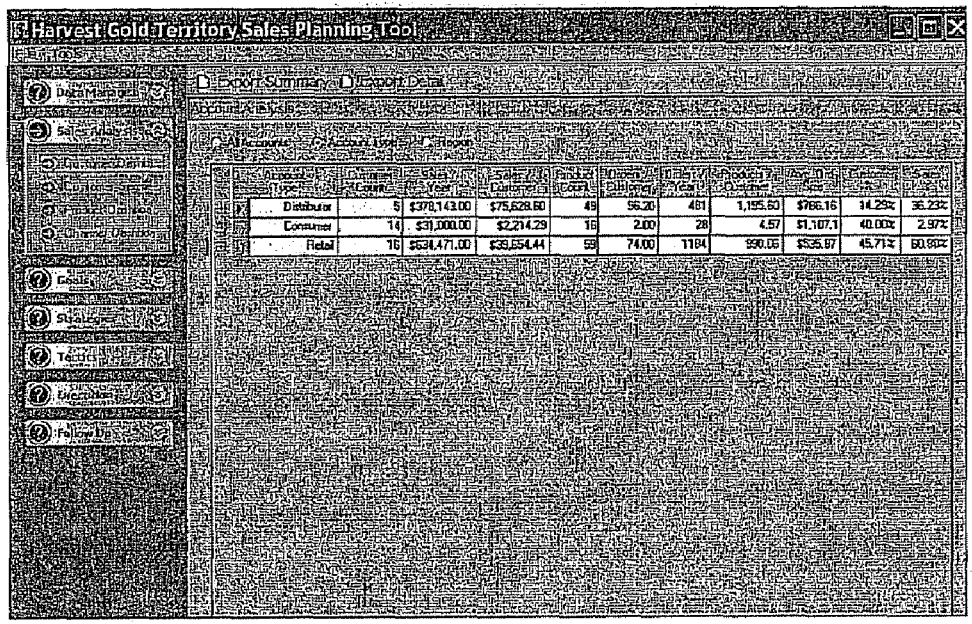
Figure 4B:
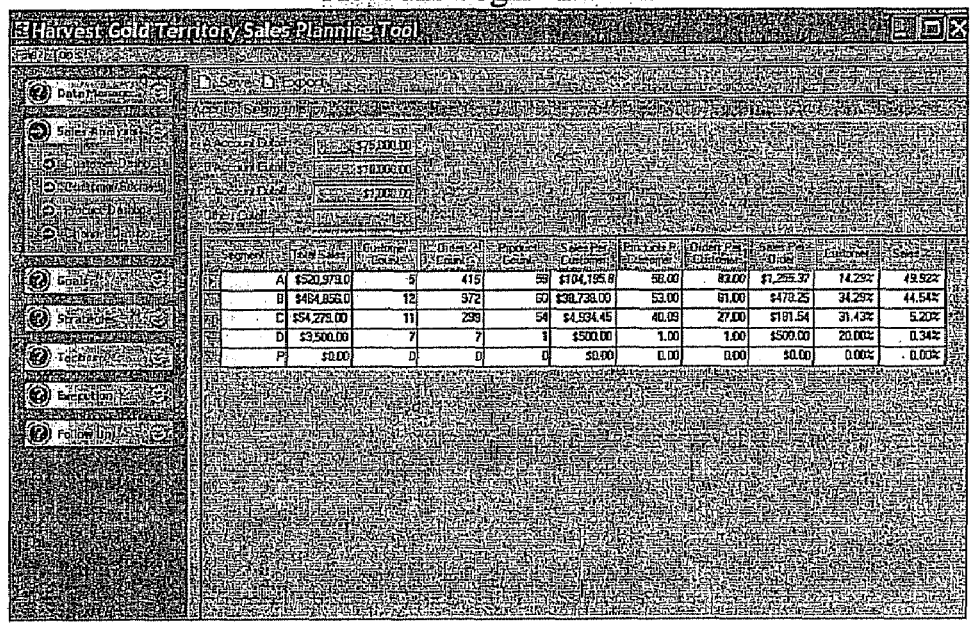
Figure 14:
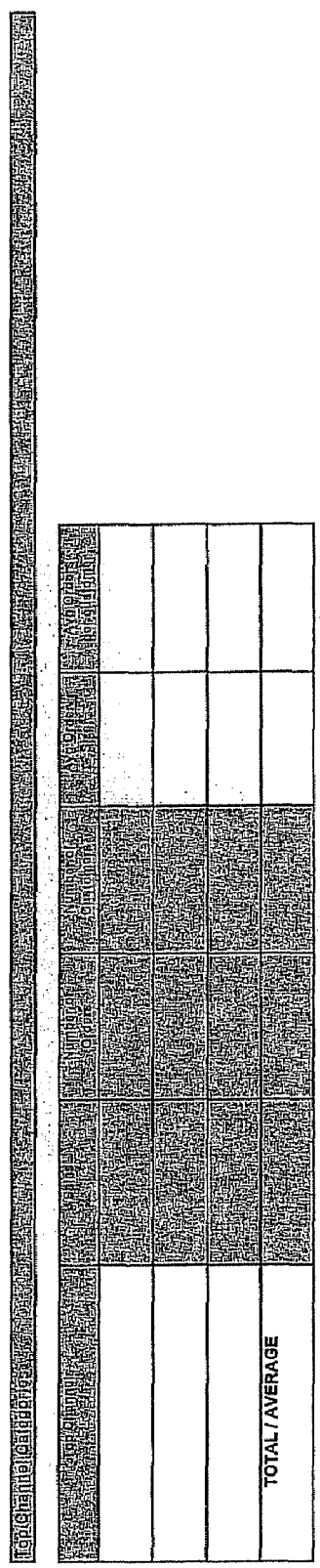
FIG. 14 is a territory dashboard template embodied in a paper or spreadsheet version, which may also be embodied in software format.

Once the historical data is compiled (or otherwise imported, as from a CRM, SFA, back-end order processing, or account system, wherein the present invention is embodied in software, such as in FIG. 3*a*), a template is created to provide a quick snapshot that to captures that information by territory in a format that will assist the user to identify key trends and opportunities. This can be done using a "Territory Data Dashboard" (see FIG. 14 for an example of a paper or spreadsheet version as described here; see FIG. 4*a* as an alternate example of a software embodiment employing this basic idea) that summarizes information into several different categories. These categories include: customer segmentation; product/line analysis; channel analysis; and prospect analysis.

In this step the user defines sales success for the company, sales organization, and sales representatives, and determining quantitative key metrics, where the key metrics comprise of both key productivity metrics and sales activity metrics. The key metrics should be quantifiable and they should be ones that are relevant to company goals. Preferably they are easy to measure (i.e., quantifiable within sufficient certainty) and they are easily understandable. Key productivity metrics function to measure results and/or key deliverables. Examples of these are numbers of proposals delivered, number of closings, revenue generated, and new customer acquisitions. Sales activity metrics function to measure sales activity functions, such as number of phone calls, appointments, and product demonstrations. The total number of key productivity metrics and sales activity metrics used should not exceed five. Using too many can defeat an otherwise efficient and well thought out sales territory plan. A worksheet can be used to help define what metrics will be used as an aid in organizing the sales data (see FIG. 12 as an example of what would occur in a software embodiment as a variation of this basic idea; the paper or spreadsheet version is embodied as described here) or this can be implemented in software format.

In an example of this step, customer segmentation category requires the user to assess customer specific information (see FIG. 13 for an example of a paper or spreadsheet version as described here; see FIGS. 3*b*-3*d* and 4*b* as alternate examples of a software embodiment employing this basic idea). This is gathered by asking questions such as: Who are my best and worst customers? What do they buy and how much do they buy? What are my average order sizes by customer segment?

The product/line analysis (paper or spreadsheet version is as described here; see FIG. 4*c* as an alternate example of a software embodiment which employs this basic idea) requires the user to assess its various products and different lines or services. This information is gathered by asking questions such as: What products or lines sell the most? Which products or lines have the most customers and which ones generate the most orders? What are their average order sizes?

The channel analysis requires the user to consider the channels used for obtaining company business. This is gathered by asking questions such as: Where are my sales coming from? What percent of my business comes from field orders, telephone orders, orders placed at trade shows or markets, orders taken by channel partners?

The prospect analysis requires the user to project the company's potential or desired customers. The analysis is undertaken by asking questions such as: Who are my top prospects? How many prospective new customers do I have?

The information solicited from these analyses are reviewed and the sales account data generated from that step is then organized in such a way where the accounts are segmented by several discrete categories. These segmented categories help the sales people to visualize the data in different formats to help determine which groupings of which sales accounts are the most profitable, viewing the sales data in various perspectives as angled by the various segmented categories.

One mode of segmenting which is to be done consists of utilizing customer category entries such as A, B, C, D, and other, organizing the sales accounts in such a way where they are aggregated by the most profitable sales accounts to the least (hence a grade A, B, C, D sales account, from best to worst) (see FIG. 13 as an example of the paper or spreadsheet version as described here—this may be alternatively embodied in software using this basic idea). Using this method of aggregation, a monetary sales minimum and monetary sales maximum are also defined for these grades (A, B, C, D, and other) for review by the sales person and for showing one such view of profitability among sales accounts.

Other ways of segmenting that are to be done include segmenting by industry, account type, products and services of the company, and also sales channels (i.e., sources of sales) of the company (see FIG. 13 as an example of the paper or spreadsheet version as described here; this may also be alternatively embodied in a software version using this basic idea).

To help further analyze and organize the sales data, a territory dashboard (see FIG. 14 as an example of a paper or spreadsheet version as described here; see FIG. 4a as an alternate embodiment in software which uses this basic idea) is then created, which represents the segmented accounts as described above—segmented accounts by industry, account type, products and services of the company, and channels of the company (see FIG. 13 as an example of the paper or spreadsheet version as described here; this may also be alternatively embodied in a software version employing this basic idea). The territory dashboard (see FIG. 14 as an example of a paper or spreadsheet version as described here; see FIG. 4a as an alternate example of a software embodiment using this same basic idea) is where the sales people review this information as a tactical aid in thinking about how the number of orders for products/services that have high average order sizes can be increased, how the number of orders placed by account or channel segments that have high average order sizes can be increased, and how the average order size of accounts and average order size of sales channels can be increased, where large volumes of orders are placed for the foregoing. It provides a way of visualizing a summary of the key territory characteristics and data by customer segment, such as the A, B, C, and D accounts or as categorized by industry, by product line or category, including average order size and number of orders, sales channels (i.e., sources of sales), as in inside vs. field sales and channel vs. direct sales. See FIG. 13 as an example of the paper or spreadsheet version, which may also be embodied in a software version.

Based upon the categories of information income and productivity goals for are established for the company, and optionally for individuals within the company. Productivity goals include, for example, average order size, average orders per customer, etc. Territory dashboard facts (see FIG. 14 as an example of a paper or spreadsheet version as described here; see FIG. 4a as an alternate example of a software embodiment using this same basic idea) are to be used with income goals in order to help create a goal setting questionnaire (see FIG. 15 for an example of a paper or spreadsheet version as described here; see FIGS. 5b and 6a-6e as an alternate example of a software embodiment using this same basic idea) and establish those income and compensation goals.

In a next step, goals are set. Goals are set by having the user identify income objectives. And asking what are the facts about my territory, what are my productivity and activity goals for this next quarter? This year? How much growth can I count on from existing customers, and how much new business do I have to write to hit my goals? What are the key sales statistics or "metrics" that I can track proactively to ensure that I make the money I want to make this year?

In this step the user sets sales goals for the company or each individual member of the sales team. The sales person checks the resulting sales goals against company assigned quotas or sales targets, sets activity and productivity goals, and tracks key metrics. There are three tools that assist in this process: 1) a customer budget template, 2) a goal setting questionnaire (see FIG. 15 as an example of a paper or spreadsheet version as described here; see FIGS. 5b and 6a-6e as an alternate example of a software embodiment using this same basic idea), and 3) a goal summary sheet.

The customer budget worksheet enables the sales person to project sales for each customer over the upcoming year (or other selected, finite time period). The customer budget template includes the customer name, account type, sales account type for that customer, category, last year sales, projected sales for this year, and any notes the sales person wishes to add as related to the customer account. This can be implemented in paper, spreadsheet, or software format.

The goal setting questionnaire (see FIG. 15 as an example of a paper or spreadsheet version as described here; see FIGS. 5b and 6a-6e as an example of a software embodiment employing this same basic idea) is where the sales person enters information about specific strategies used to reach the sales person's sales and compensation goals. In determining the sales goals, the sales person must set realistic goals which are reachable, the sales revenue goal must meet minimum requirements for the territory, the income objectives must be aggressive, and the territory must support the level of activity required to produce the targeted results.

Figure 5A:
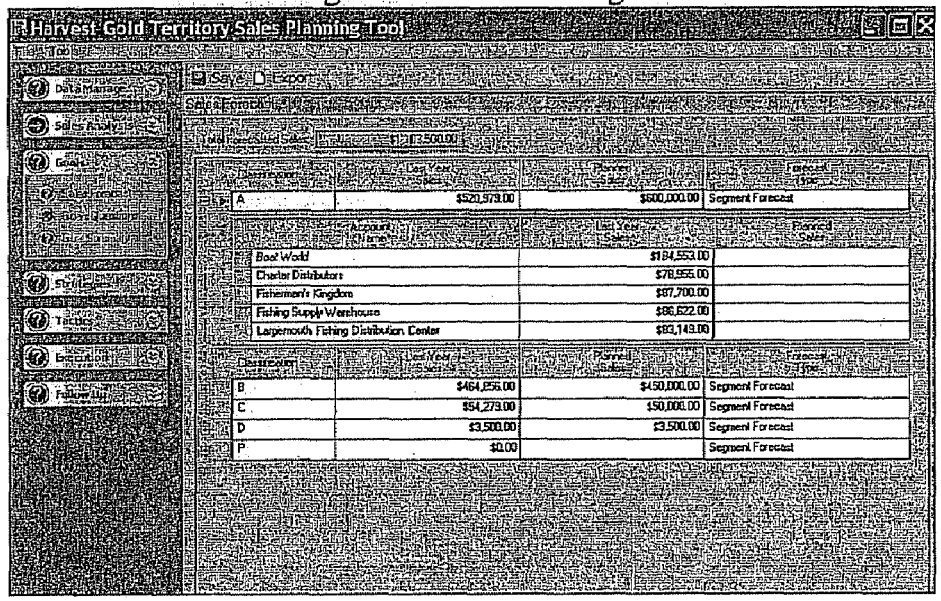
FIGS. 5a-c are an example of screen shots used in a computer facilitated embodiment of a goal setting step in the process.
Figure 5B:
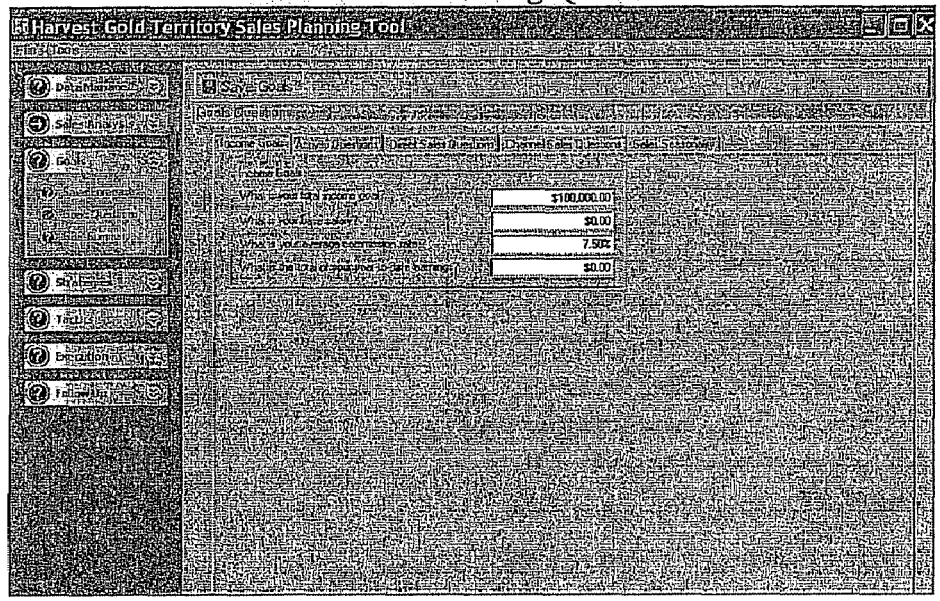

The goal setting questionnaire (see FIG. 15 as an example of a paper or spreadsheet version as described here; see FIGS. 5b and 6a-6e as an alternate example of a software embodiment using this same basic idea) includes fields for reviewing and inputting or writing information concerning one or several of the following topics: 1) total compensation goal for this year and last year's result plus how much commission is needed to earn this year to meet the total compensation goal, 2) average commission rate goal for this year, last year's result, and how much business needed to write in for this year, 3) monetary amount of business that is forecasted to come from existing clients next year and the required new business the sales person has to generate (the forecasting can be done on paper, using a spreadsheet, or software; an example of a software embodiment is in FIG. 5a), 4) percent of business the sales person is forecasting to come from existing clients, new clients, and the total which should equal 100% (see #4 for the forecasting reference), 5) the number of phone calls it takes to get an appointment with a new prospect, the success rate (in percentage form) from cold calling, 6) percent of appointments with existing clients that result in sales, 7) percent of orders from existing clients which require on site visits or how many times a year on average the sales person has to visit the existing clients, 8) number of new prospects the sales person has to meet to obtain a new client, 9) number of appointments with a new prospect that is required to close the first sale, 10) success rate (in percentage form) of appointments with prospects that result in sales, 11) average order sizes for existing customers for this year and last year and number of orders the existing customers place per year, both this year and the last year, 12) average order sale size for this year and last year, and 13) the number of orders the sales person will place with new clients per year for this year.

Figure 5C:
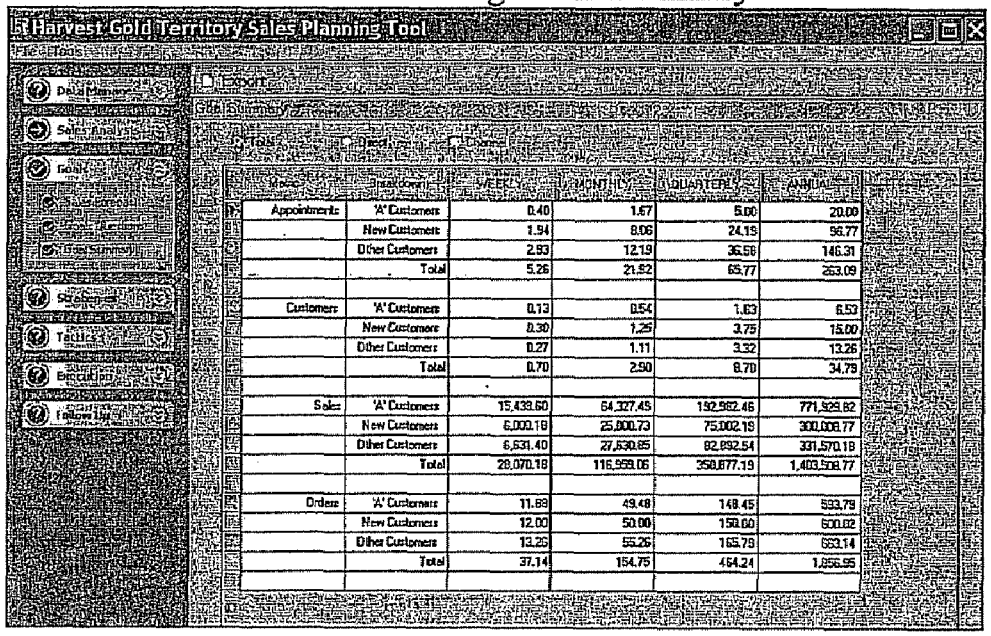
Figure 6A:
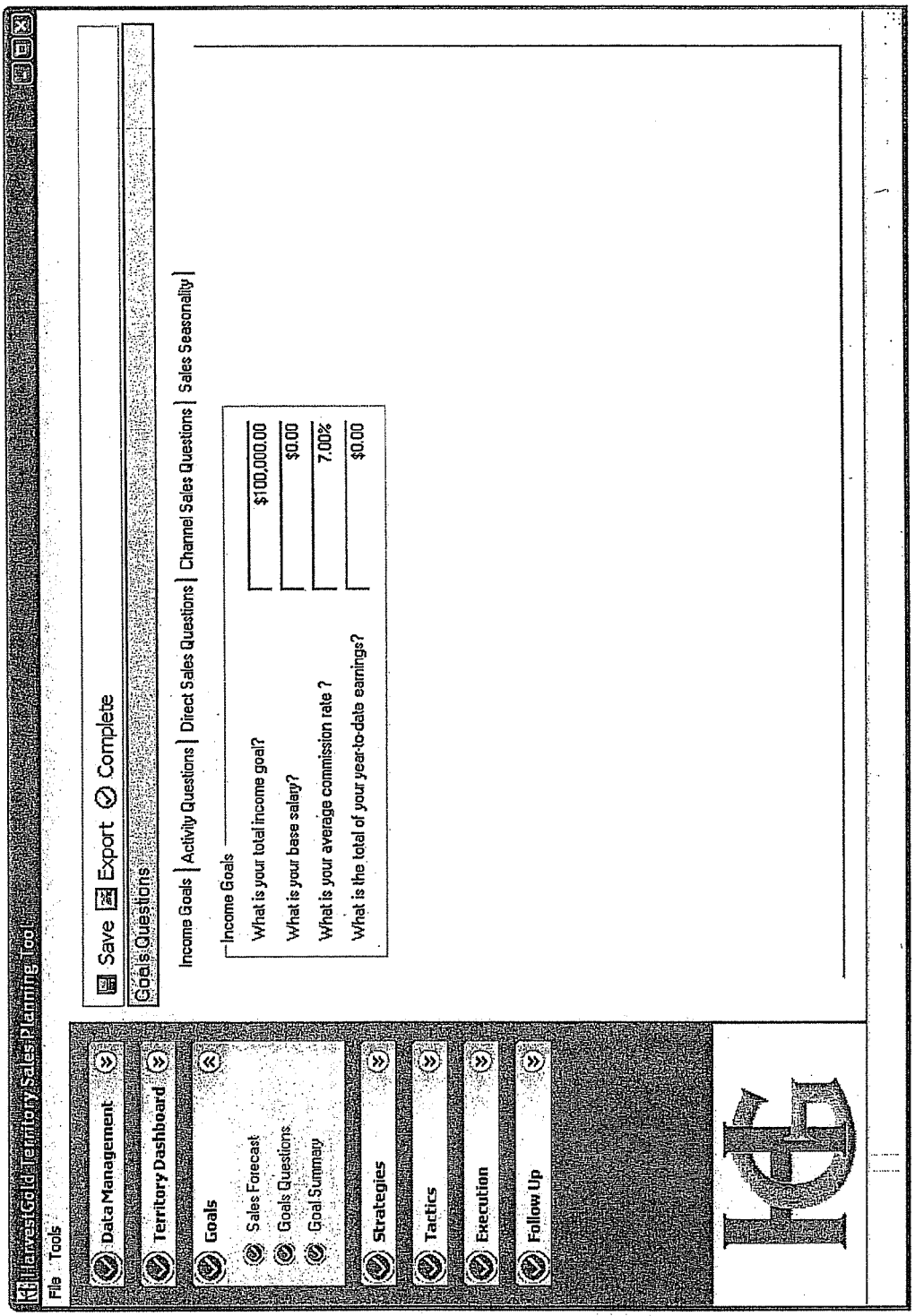
Figure 6B:
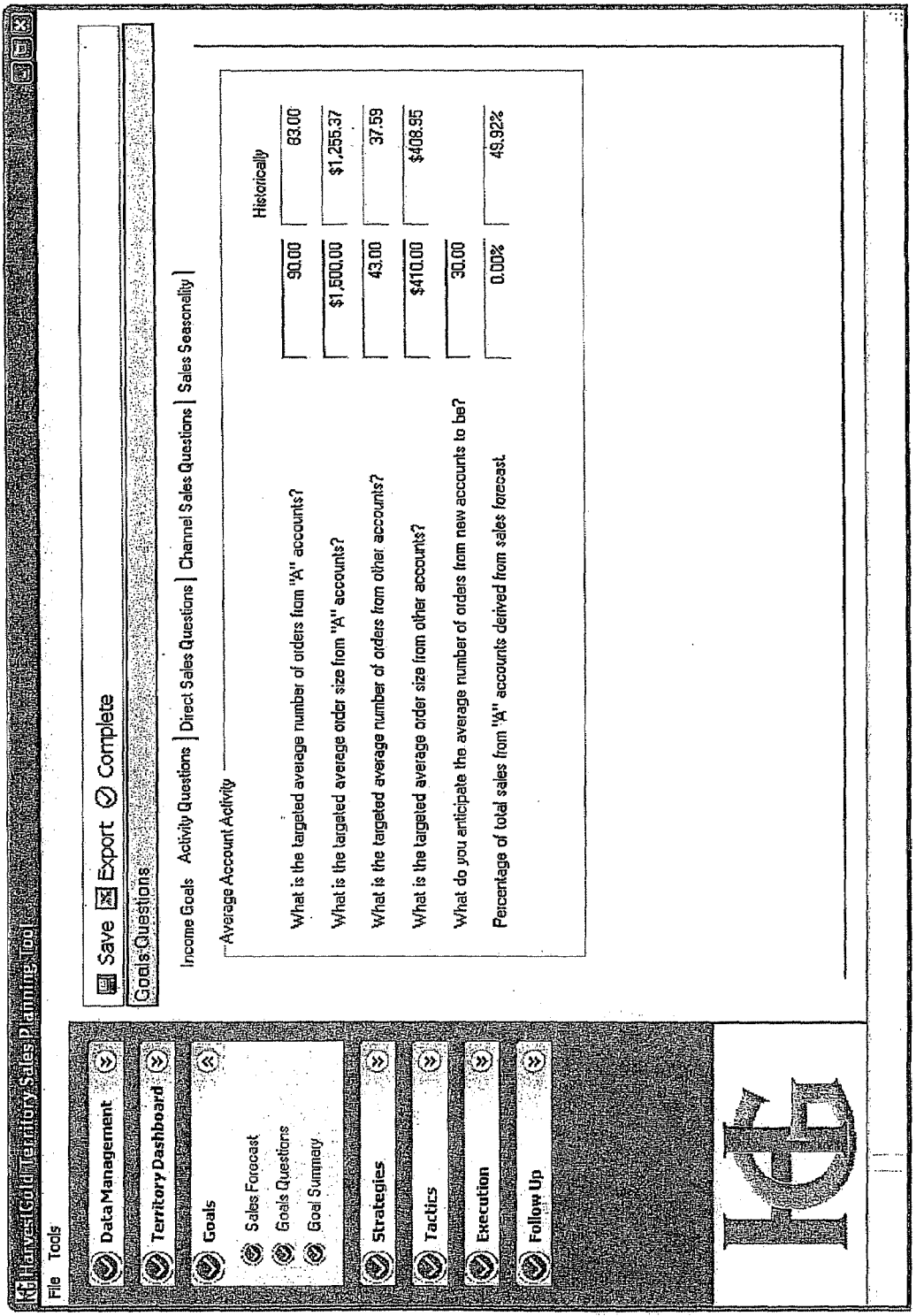
Figure 6C:
Figure 6D:
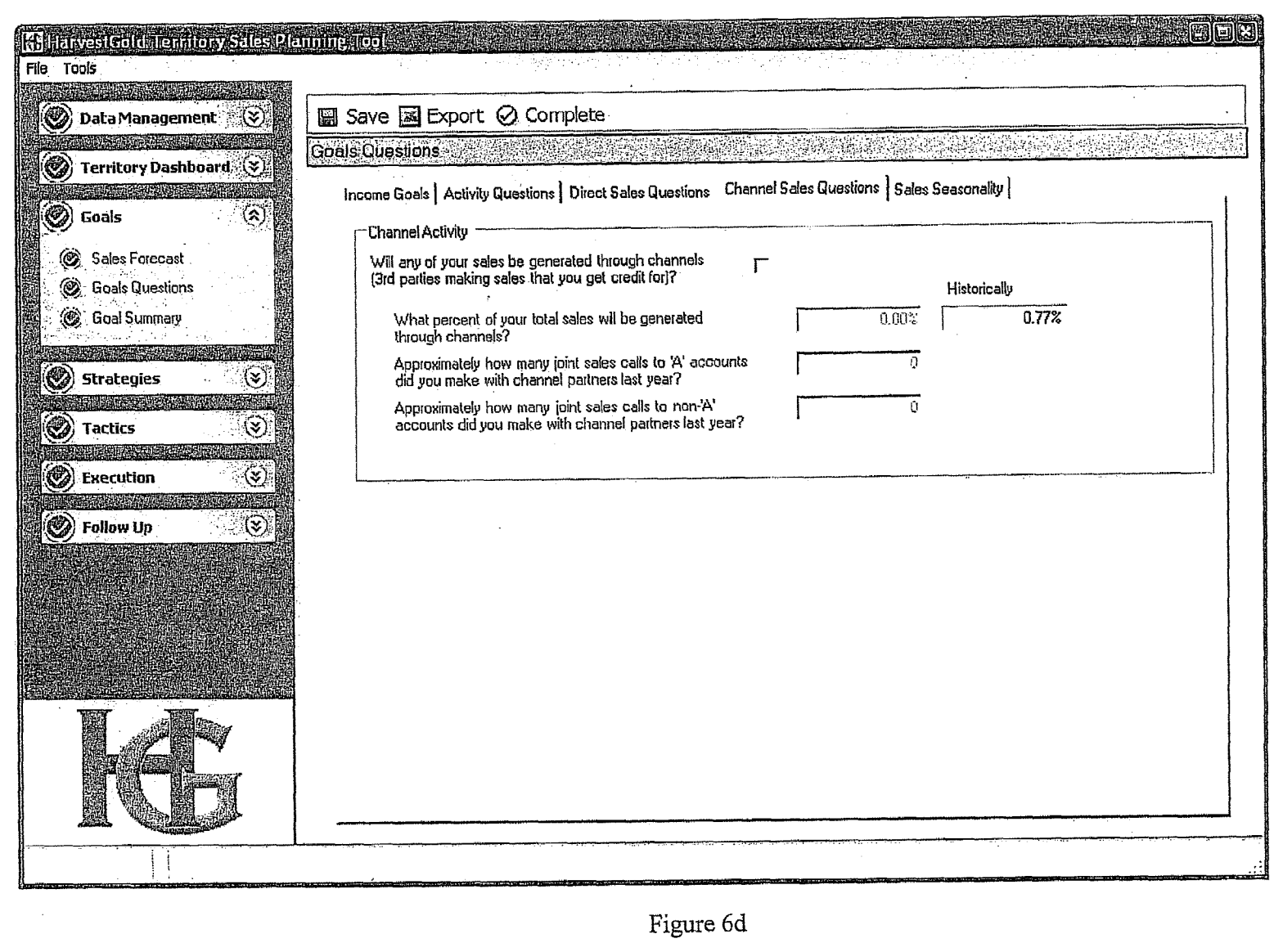
Figure 6E:
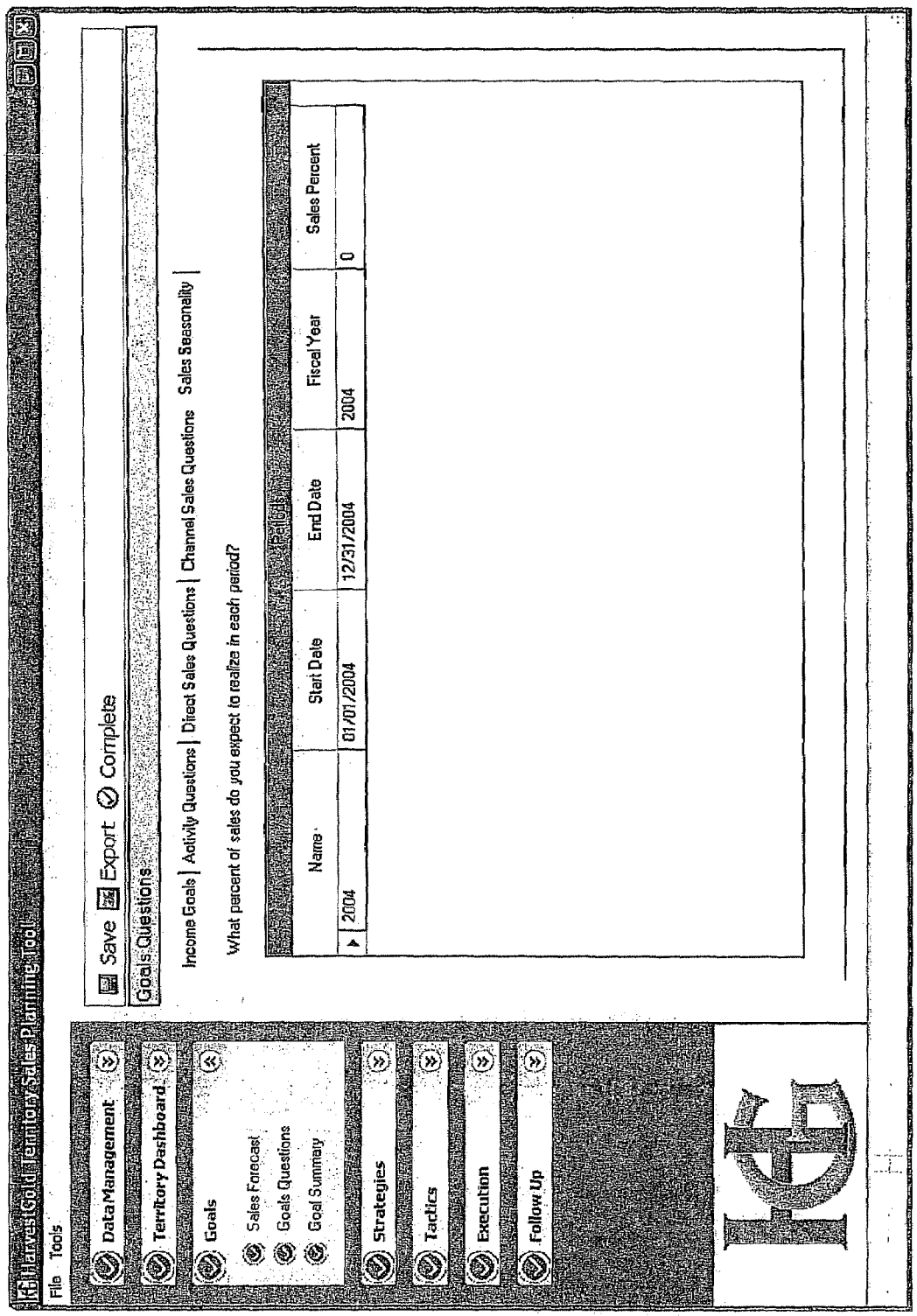
Figure 7A:
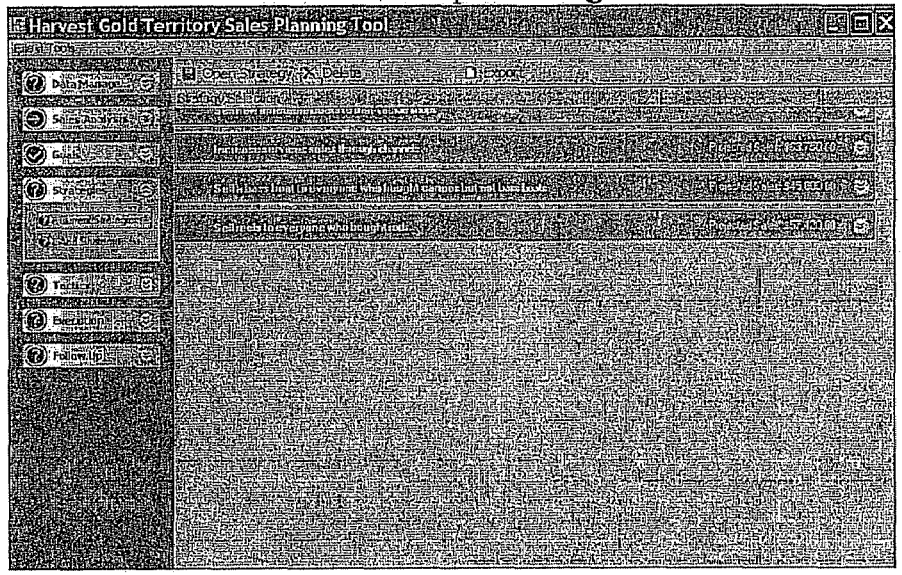
FIGS. 7a-d are an example of screen shots used in a computer facilitated embodiment of a strategies step in the process.
Figure 7B:
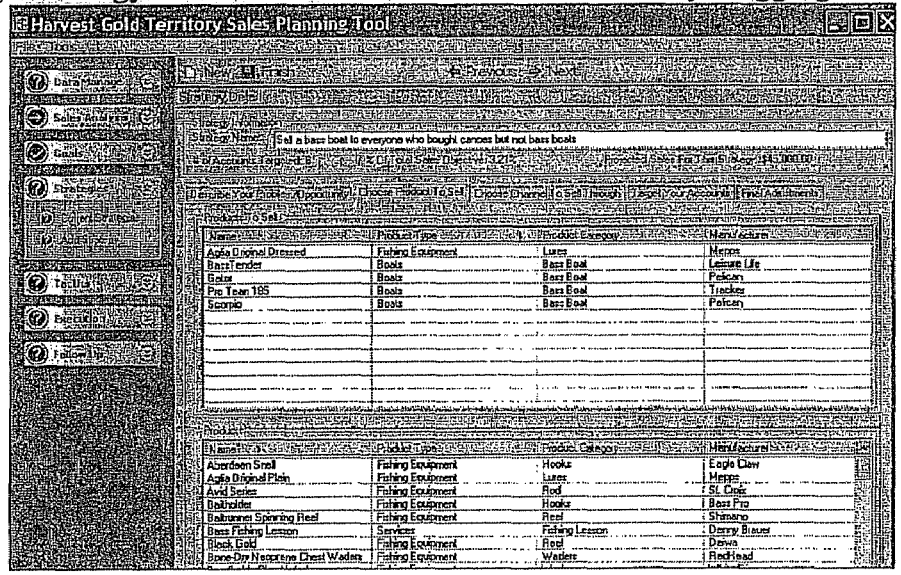
Figure 7C:
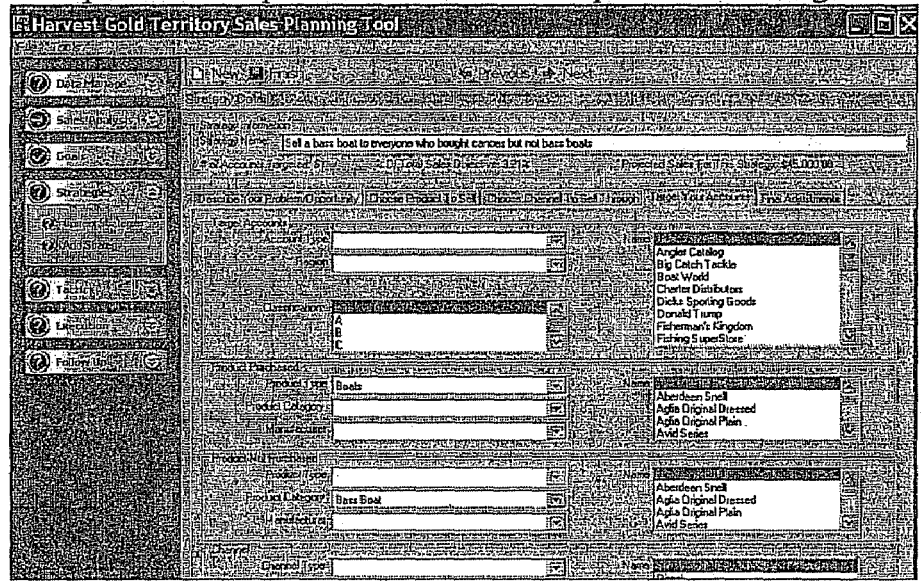
Figure 7D:
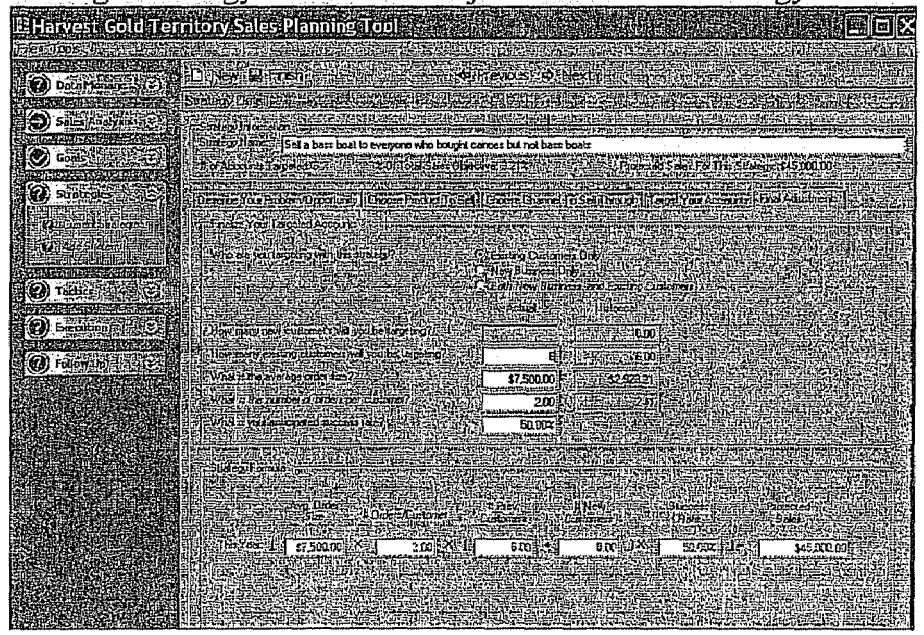
Figure 8A:
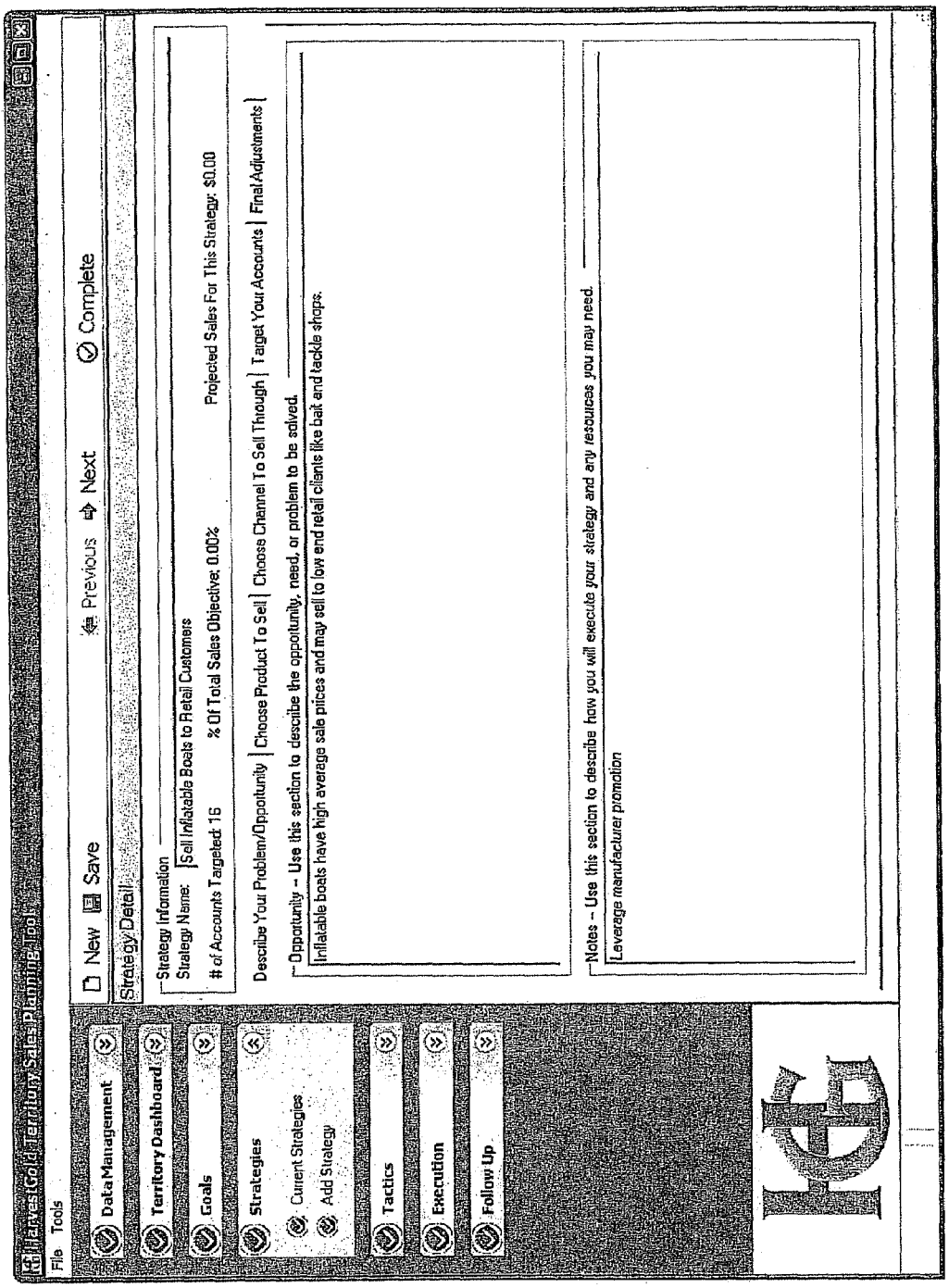
Figure 8D:
Figure 8E:

The goals summary sheet (see FIG. 16 as an example of a paper or spreadsheet version as described here; see FIG. 5c as an alternate example of a software embodiment which employs this same basic idea) helps the sales person visually determine the activities that must be completed, the rate or frequency with which these activities must be completed to reach the sales goals (as defined in the answers to the goal setting questionnaire (see FIG. 15, a paper or spreadsheet version as described here; see FIGS. 5b and 6a-6e as an alternate example of a software embodiment using this same basic idea)). The goals summary sheet (see FIG. 16 as an example of a paper or spreadsheet version as described here; see FIG. 5c as an alternate example of a software embodiment using this same basic idea) helps the sales person to tabulate data on an annual, quarterly, monthly, weekly (assuming 45 productive weeks per year), and daily basis. It lists the following data: 1) commission income goal, 2) a first activity goal as represented by the number of phone calls to prospective new customers, 3) a first activity goal as also represented by value per phone call (as determined by projected sales divided by number of phone calls to prospective new customers), 4) a second activity goal representing the number of existing customer appointments, 5) a second activity goal representing the number of new customer follow-up meetings, 6) a second activity goal as also represented by the number of new customer first meetings, 7) a total of the numerical values of the number of existing customer appointments, new customer follow-up meetings, and new customer first meetings (in view of the activity goals as described above in steps 4-6), 8) a first productivity goal representing the number of customers in which a sale occurs with respect to existing customers, new customers, and the total, 9) a second productivity goal representing the monetary amount of sales revenue with respect to existing customers, new customers, and the total, and 10) a third productivity goal representing the number of sales transactions/orders with respect to existing customers, new customers, and the total.

In addition to goals, strategies are evaluated. To identify strategies requires the user to consider issues, in addition to the normal course of business in a territory, such as what two or three specific growth strategies can I focus on to maximize my opportunities for success? What types or categories of customers represent my best opportunity for growth? What products or lines would they most likely purchase? What will I do new or different to change their buying behavior? What competitors must I prepare to sell against?

Figure 17:
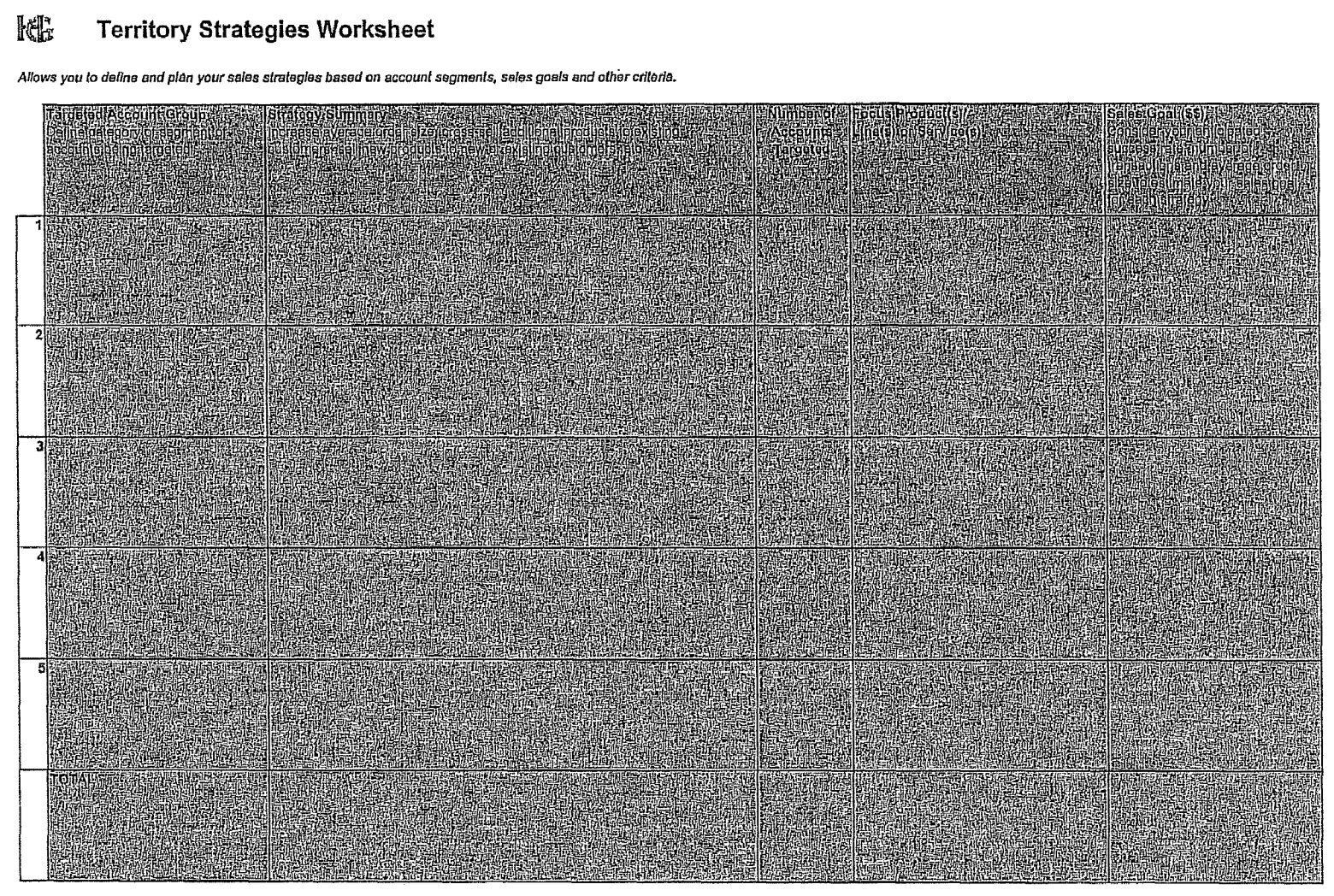

The sales strategy can be constructed with the aid of a territory strategies worksheet (see FIG. 17 for a paper or spreadsheet version as described here; see FIGS. 7a-d and 8a-e for an alternate example of a software embodiment using this same basic idea) for planning sales strategies based on segmented accounts, sales goals, and other relevant criteria (see FIG. 13 as an example of the paper or spreadsheet version as described here; this may also be embodied in a software version using this same basic idea). The territory strategies worksheet (see FIG. 17 for a paper or spreadsheet version as described here; see FIGS. 7a-d and 8a-e for an alternate example of a software embodiment using this same basic idea) helps the user to consider what segment of the territory market represents the best opportunity for growth, what products are the best fit for each segment, what will the sales person try new or different to generate a better sales result, and what the sales person's goals are relative to the strategies the sales person ultimately decides to employ. The territory strategies worksheet (see FIG. 17 for a paper or spreadsheet version as described here; see FIGS. 7a-d and 8a-e as an alternate example of a software embodiment using this same basic idea) helps one define and plan the sales strategies using the following criteria: 1) defined category of segments of accounts being targeted—the targeted account group, 2) a strategy summary such as but not limited to increasing of average order size, cross-selling of additional products to existing customers, selling new products to new or existing customers, 3) number of accounts targeted, 4) focus product(s) or line(s) or service(s), 4) a monetary value representing the sales goal, considering the sales person's anticipated success rate, number of transactions, and average order size to estimate the sales person's sales goal for each strategy, and 5) a sum total of the foregoing numerical values for all entries as related to defined categories of segments of accounts being targeted. It also delineates the strategy goals and results including the defined strategy (there may be more than one), sales goal, actual sales, percent of goal, comments, and any adjustments.

Results of these steps either viewing on worksheet or computerized provide a basis for arriving at tactics. The tactics are derived by considering various issues such as: What specific accounts should I target based upon my growth strategies? How will I plan and prepare for sales calls with my target customers? What sales techniques and methodologies will I use to maximize my effectiveness on those calls? Where are my targeted accounts? How often and when exactly do I plan on calling on them?

Figure 9A:
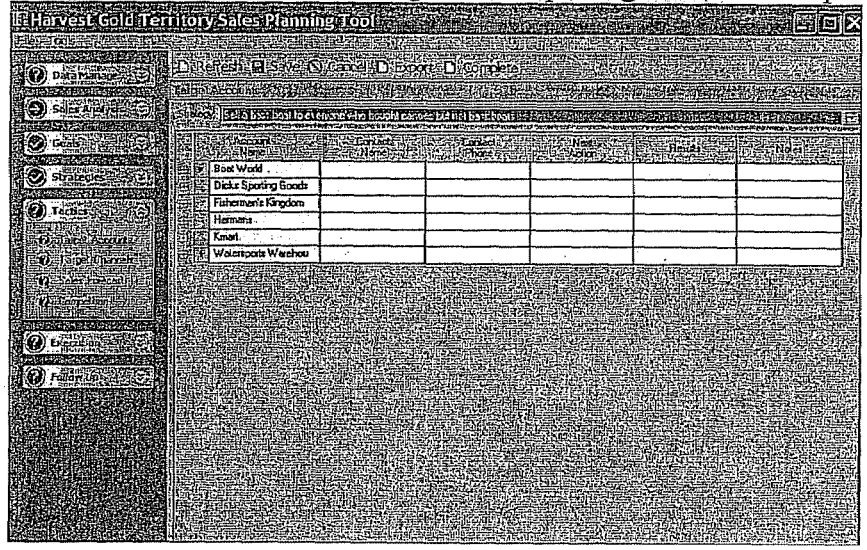
FIGS. 9a and b are an example of screen shots used in a computer facilitated embodiment of a tactics step in the process.
Figure 18:
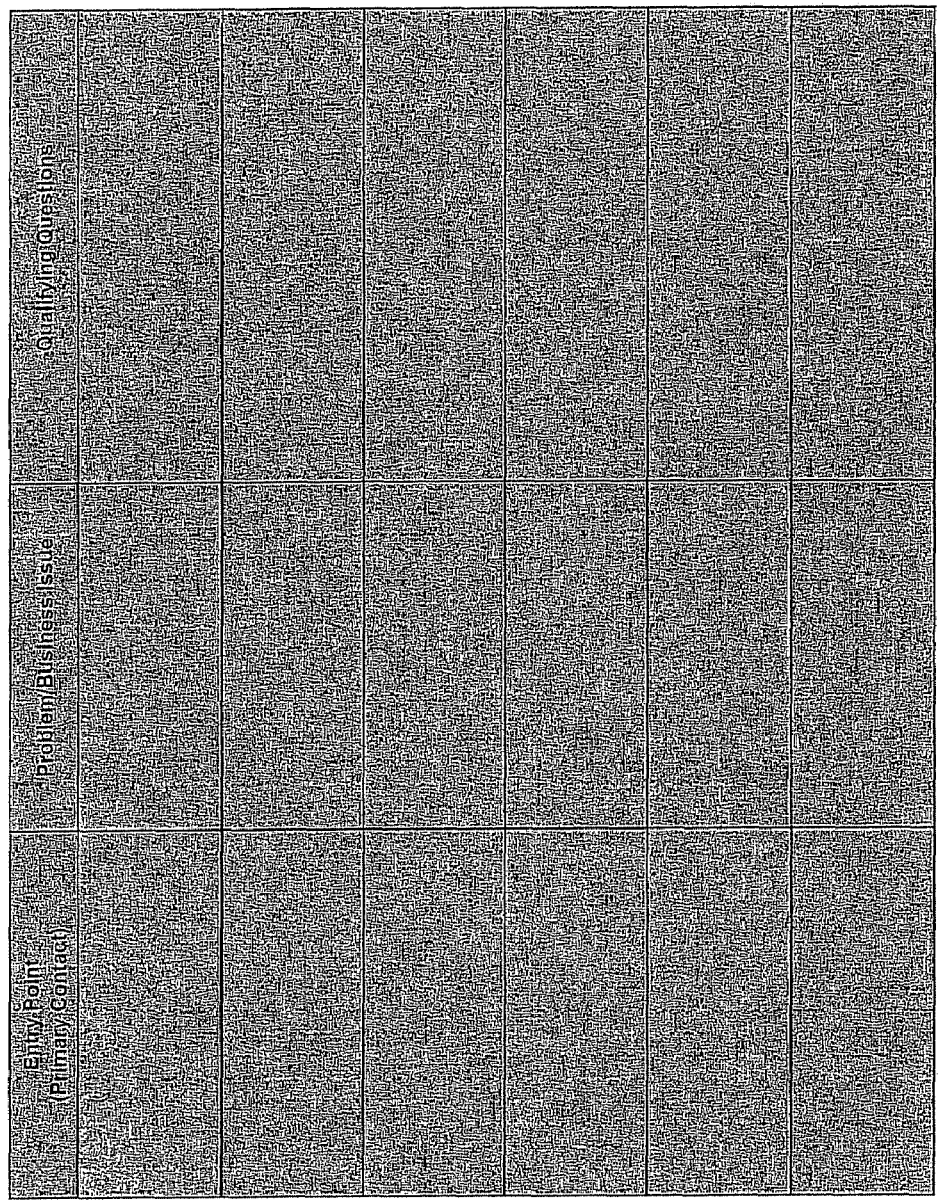
FIG. 18 is a sales campaign worksheet embodied in a paper or spreadsheet version, which may also be embodied in software format.
Figure 19:
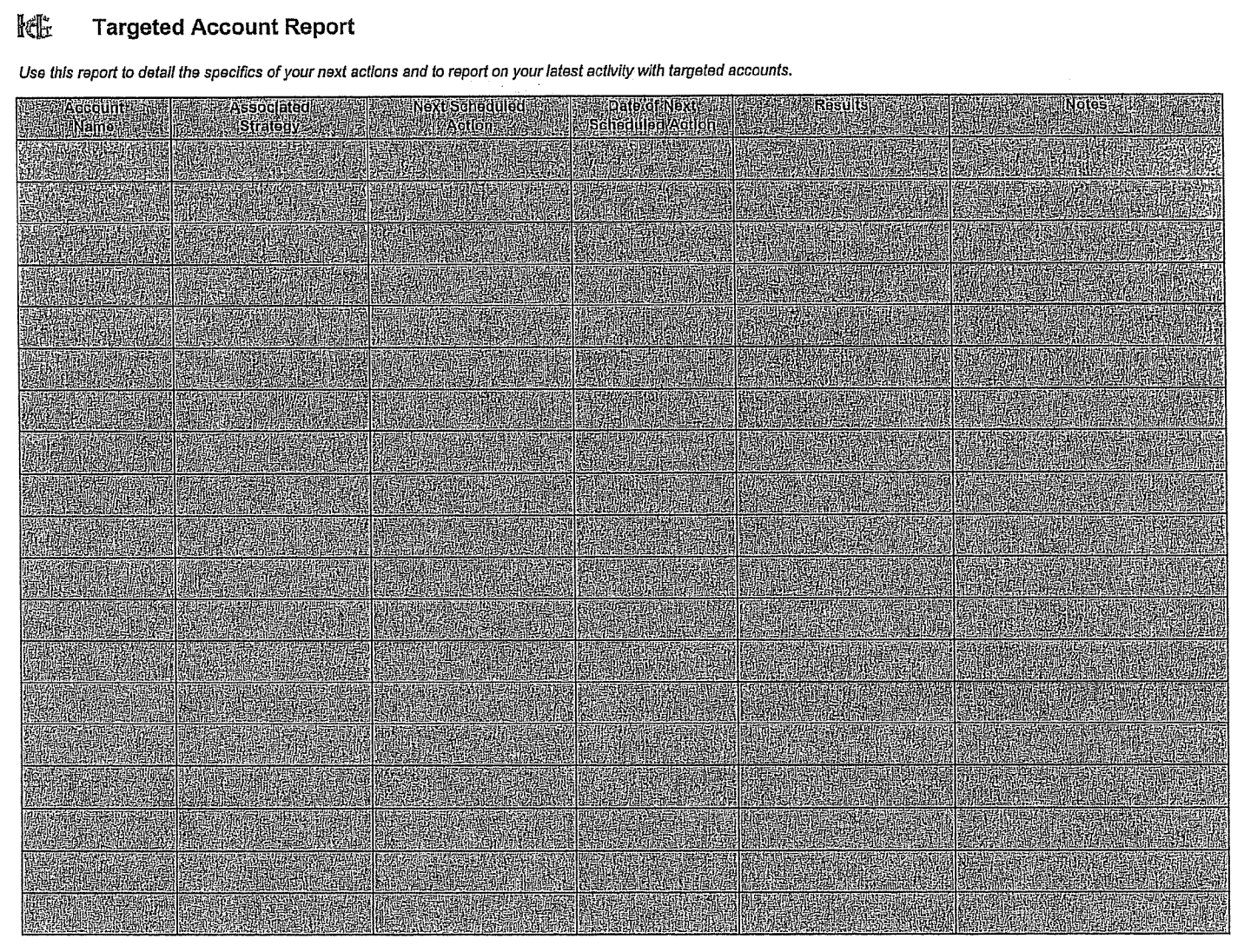

The sales tactics for putting the plan into action may be created using the following methods: 1) creating a focus list targeting specific accounts that meet the company's growth strategy, 2) developing account level strategies and plans for the targeted accounts, 3) planning standard travel routes throughout the sales person's territory, 4) creating a time management plan for scheduling time for administrative tasks, service tasks, and addressing customer issues, 5) using the following specialized tools: a targeted account report (see FIG. 19 for an example of a paper or spreadsheet version; see FIG. 9a as an alternate example of a software embodiment using this same basic idea), a sales campaign worksheet (see FIG. 18 for the paper or spreadsheet version as described here; this may alternatively be embodied in software using this same basic idea), and a competition worksheet.

The targeted account report details the specifics of the sales person's next action and reports the latest activity with the targeted accounts. It comprises the following criteria: account name associated strategy, next scheduled action, results, and notes.

A sales campaign worksheet (see FIG. 18 for the paper or spreadsheet version as described here; this may alternatively be embodied in software using this same basic idea) is used to define and plan the sales person's sales campaigns based on account segments, sales goals, and other criteria. It comprises the following criteria: campaign name and description, campaign owner, target market(s), source(s), number of contacts, entry point (primary contact), problem/business issue, qualifying question(s), the solution, customer example, targeted number of sales, and the targeted revenue objective.

The competition worksheet is a report used to identify and evaluate the competition as well as plan activities that will help the sales person's organization overcome the competition's strengths or otherwise exploit its weaknesses. It comprises the following criteria: 1) competitor, 2) competitor's strengths, and 3) competitor's weaknesses.

Figure 9B:
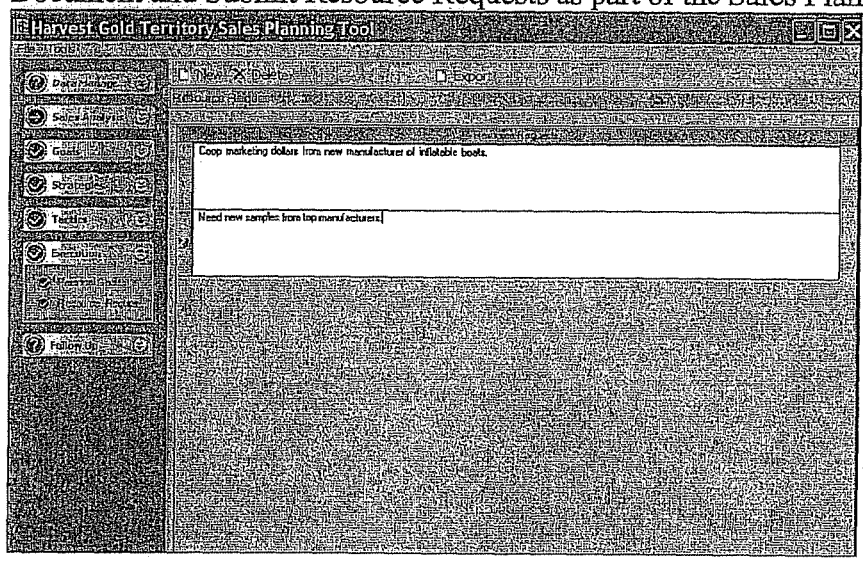

Once the tactical action plan is established, in an example of the invention it is executed (see FIG. 9b as an example of a software embodiment; this may be also executed on paper or using a spreadsheet). To determine how best to execute the plan, the user should consider: How will I motivate myself to meet my activity goals every day? How will I track my key sales metrics and sales results against the goals I have set for myself? How often will I review key metrics and results with my sales manager? How often will I revisit my territory plan and growth strategies with my sales manager (to make adjustments as needed)? How will I reward myself as I meet my activity and productivity goals?

As an optional step, an execution and follow-up phase is conducted. For this step a territory plan review form, a sales campaign worksheet (see FIG. 18 as an example of a paper or spreadsheet version; this may be alternatively be embodied in software using this same basic idea), and a targeted account report are used to aid in executing and following up with respect to the sales territory plan. It should be used in conjunction with weekly pipeline reports, where the sales person's progress with targeted customers using a list of targeted accounts (see FIG. 9a of an example of a software embodiment and FIG. 19 as an alternate example of a paper or spreadsheet embodiment using this same basic idea) is tracked, sales goals are tracked on a monthly basis in a monthly production review using current sales data as compared against sales goals and other key metrics, quarterly strategy reviews of the same, and annual performance reviews to evaluate sales people based upon their ability to execute their territory level sales plan and modify where necessary for full optimization of the plan.

Figures 10A, 10B:
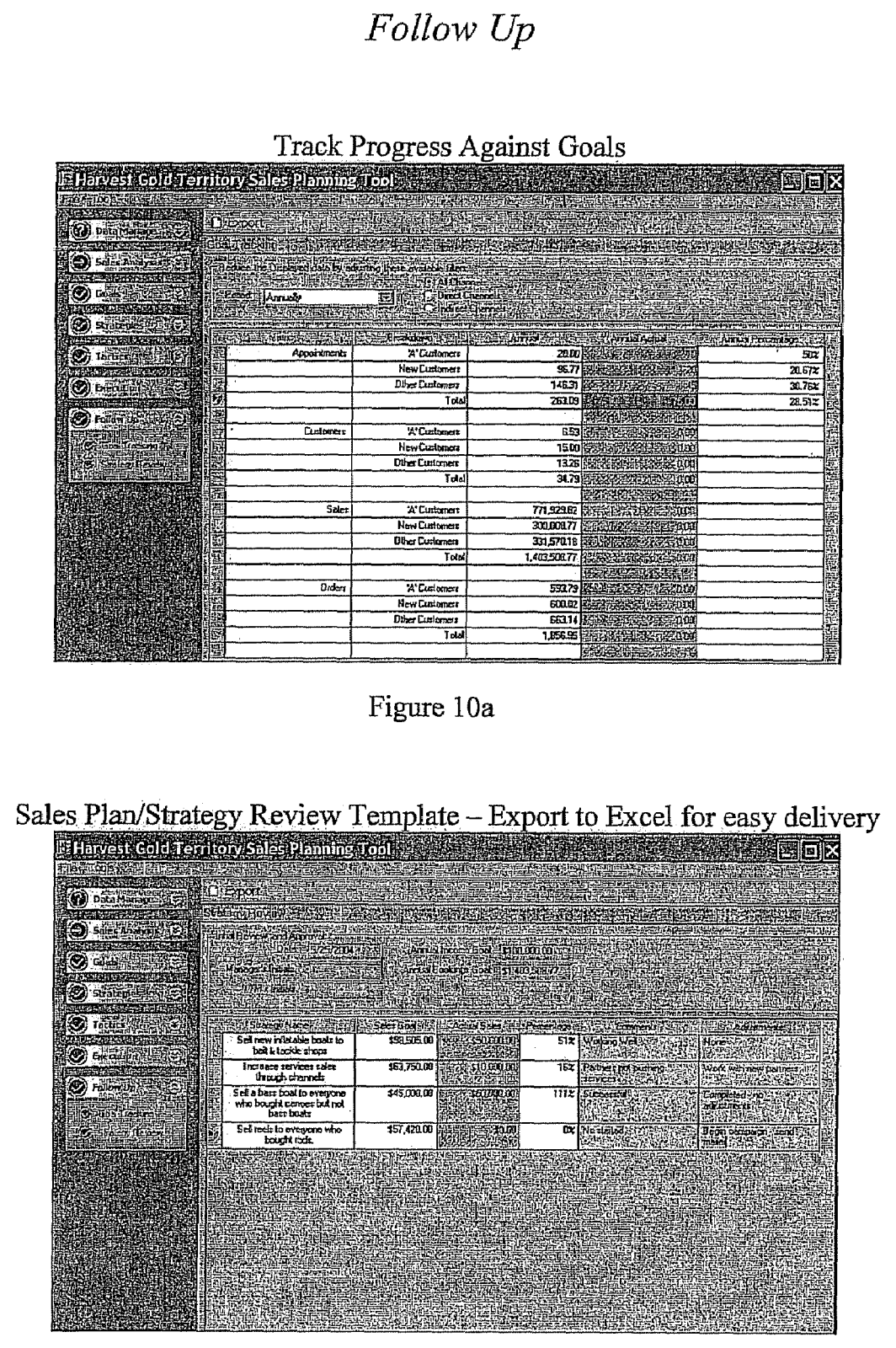
Figure 20:
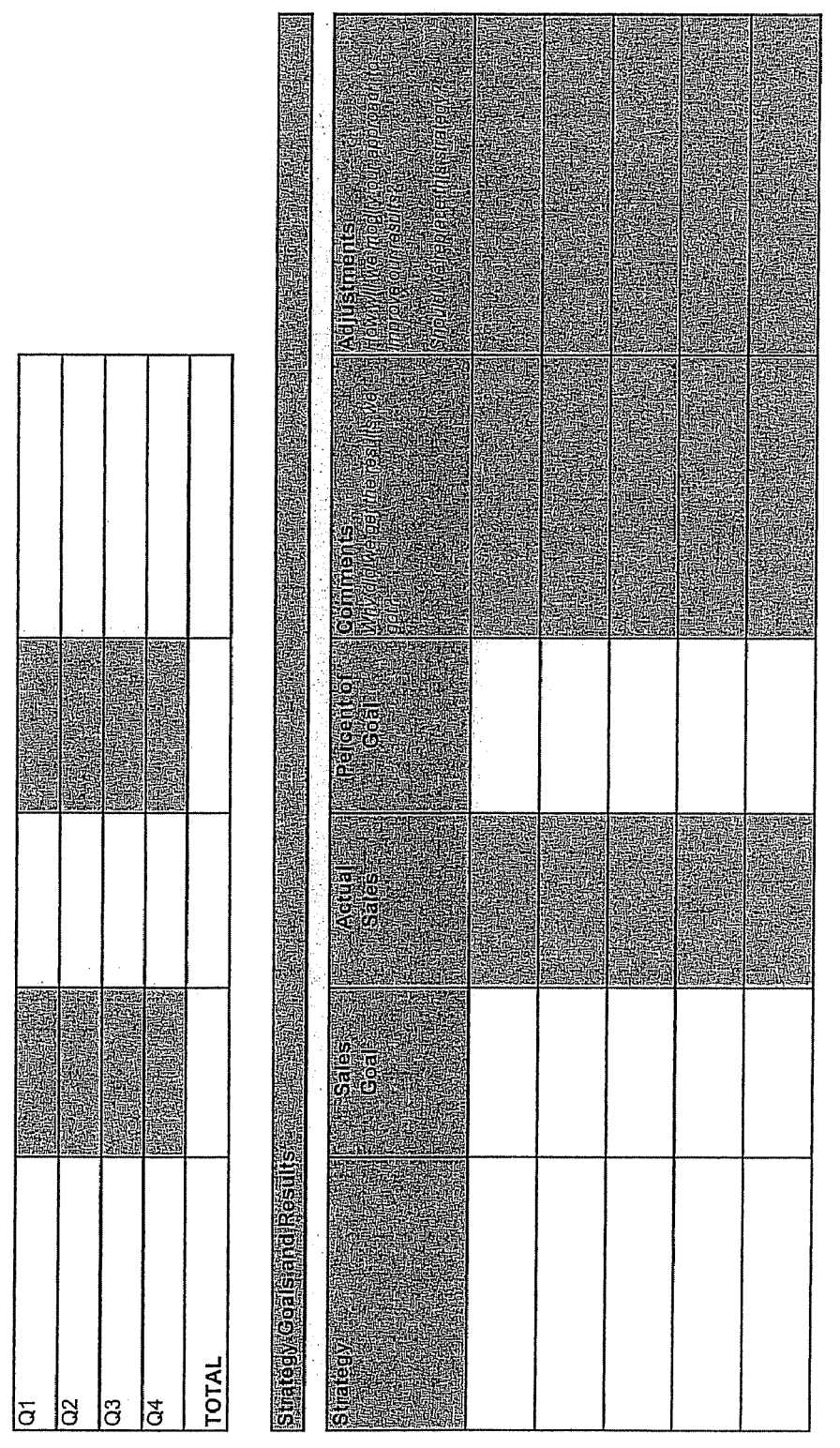

A territory plan review form (see FIG. 10b for an example of a paper or spreadsheet embodiment and see FIG. 20 for an alternate example of a software embodiment using this same basic idea) is used for a visual presentation of goals and for goal tracking (the paper or spreadsheet version is as described here; see FIG. 10a for an alternate example of a software embodiment using this same basic idea) over the plan period for both the sales manager's and sales representative's review. The review of the sales territory plan (see FIG. 10b for an example of a paper or spreadsheet embodiment as described here; see FIG. 20 for an alternate example of a software embodiment using this same basic idea) is done on a periodic basis (such as initially and each quarter of the year) and is to be signed off or otherwise authorized by the sales manager and sales representative (i.e., territory manager). The productivity and income goals and results are to be tracked, wherein the 12 month income goal is set and defined, a periodic forecast (such as a quarterly forecast) is determined according to the following criteria: 1) percentage of the year (or other time period with respect to the time period set here), 2) the monetary value representing the sales goal, 3) the actual income being generated for each time period, 4) the percent of goal achieved per time period in question, and 5) the total of the foregoing.

Figure 11:
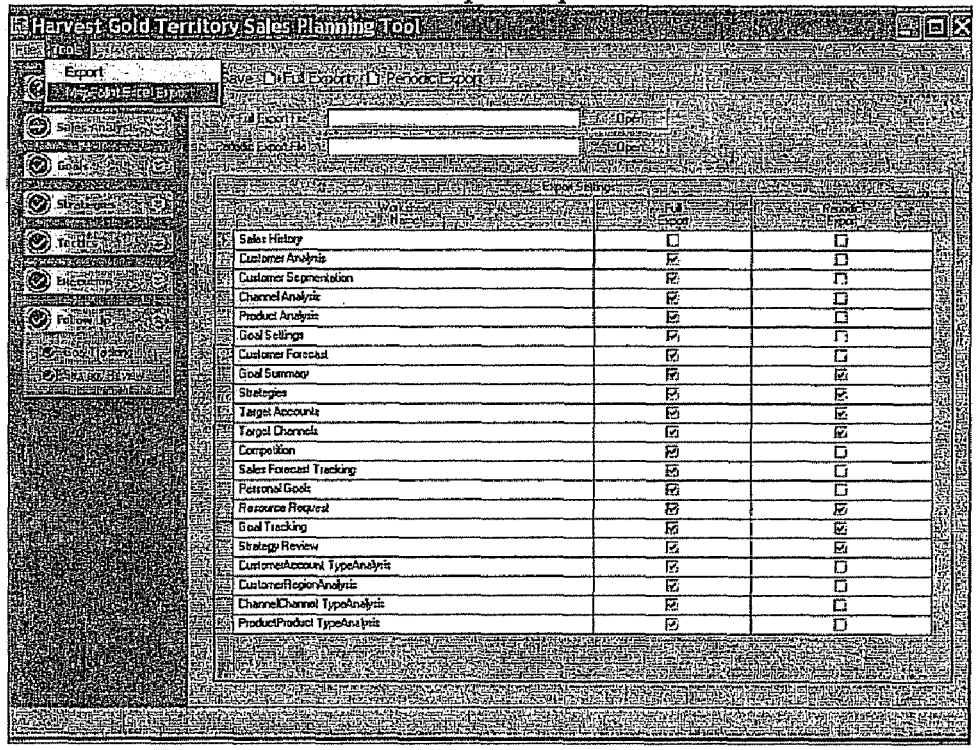
FIG. 11 is an example of screen shots used in a computer facilitated embodiment of an administrative step in the process.

These steps of the summary of the sales territory planning process are illustrated for another example in FIG. 2. The above described process may be embodied in paper (worksheet) form, or in another embodiment it is in electronic form (e.g., a spreadsheet), or software form (wherein the data may be exported to Excel as in FIG. 11) and aided by computer application. Screen shots showing examples of various embodiments of the steps of the method as viewed by the user utilizing a computer are shown for example in FIGS. 3-11.

While the present invention has been described in conjunction with embodiments thereof, modifications and variations will be apparent to those of ordinary skill in the art. The foregoing description and the following claims are intended to cover all such modifications and variations.

What is claimed is:

1. A method for making and organizing a sales territory plan for a company, the method comprising the steps performed by a computer of:
    (a) reviewing, by said computer, the company sales situation, said reviewing comprising examining data from at least one of the following: summary sales data from customer relationship management systems, sales force automation systems, and transactional data in back-end order processing or account systems;
    (b) arranging, by said computer, said data in quantitative metrics, wherein said metrics comprise at least one of a key productivity metric or activity metric, said metric showing data for said company, company representatives, or both;
    wherein said activity metrics include one or more of the group consisting of quantitative values of phone calls, appointments, and product demonstrations; and
    wherein said key productivity metrics measure results, key deliverables or both, and includes at least one of quantitative values of proposals delivered, closes, revenue generated, margin, and new customer acquisitions;
    (c) segmenting, by said computer, said metrics into customer category segments by categorizing said data as one or more of the group consisting of customer sales, industry, account type, company services and products, and company sales channels, wherein said customer sales segment has at least one of a monetary sales minimum or maximum;
    (d) generating, by said computer, a sales territory dashboard based on at least one of said data segments, wherein said sales territory dashboard represents a selected sales territory;
    (e) reviewing, by said computer, said territory dashboard to establish trends and relationships;
    (f) setting, by said computer, sales and compensation goals based upon said trends and relationships by preparing a customer budget template and goal setting questionnaire,
    wherein said customer budget template comprises information related to said customer sales segment and comprises one or more of the following items: customer name, said customer category entry, said account type, total sales for the previous year, projected sales this year based upon said total sales for the previous year, and annotations,
    (g) using said goal setting questionnaire to obtain information for items representing the compensation objectives of said company comprising:
    (i) number of phone calls needed to get a sales appointment with one of said prospective clients;
    (ii) success rate from cold calling said prospective clients, calculated from one divided by said number of phone calls needed to get a sales appointment with one of said prospective clients multiplied by one-hundred to yield a percentage reflecting said success rate,
    (iii) percentage of sales appointments with existing clients which result in sales,
    (iv) either percentage of orders from existing clients requiting on-site visits or average of number of times a year visiting existing clients;
    (v) number of sales appointments required to meet said prospective clients to secure one new client; and
    (vi) number of sales appointments required to perform a sale with said one new client, wherein a sale actually occurs;
    (h) (establishing, by said computer, a sales strategy based upon said sales and compensation goals for said segments, wherein said strategy considers one or more items selected from the group comprising: a targeted account, a strategy summary, number of said targeted accounts, company focus products, company focus lines, company focus services, monetary value representing estimation of a sales goal derived by anticipated success rate, number of sales transactions, average order size, sum total of said number of accounts targeted, and sum total of said sales goal; and (i) establishing, by said computer, a tactical sales action plan, by doing one or more of the following steps: dividing up said sales territory into discrete sections, determining how often a client needs to be contacted using information obtained from said goal setting questionnaire, defining individual routes for each of said discrete sections of said territory by planning routes from each of said customer category entry, scheduling sufficient quantity of new business appointments along said routes to meet sales activity goals using information obtained from said goal setting questionnaire, mapping sale sales territory by plotting locations of targeted existing sales accounts, non-targeted existing accounts, prospective accounts or a combination thereof, and conducting a sales campaign analysis.

2. A method for making and organizing a sales territory plan as set forth in claim 1 wherein said customer category segments consist of one or more of the following:

(a) accounts segmented by customer sales, wherein said accounts segmented by customer sales comprises of an aggregation of sales account information as sorted by sales;

(b) accounts segmented by industry, wherein said accounts segmented by industry comprises of an aggregation of sales account information as sorted by industry;

(c) accounts segmented by products and services of the company comprises an aggregation of sales account information as sorted by products and services; and (d) accounts segmented by sales channels of the company, wherein said accounts segmented by sales channels of the company comprises an aggregation of sales account information as sorted by segmented sales channels of the company.

3. A method for making and organizing a sales territory plan as set forth in claim 1 wherein each of said customer category segments of said sales territory dashboard comprises the following as associated with said accounts categorized by customer sales:

(a) accounts segmented by sales wherein said customer category is associated with said monetary sales minimum and said monetary sales maximum;

(b) number of customers;

(c) monetary value of total sales;

(d) number of orders;

(e) average size of said orders;

(f) average of said orders per customer;

(g) percentage of the total customers of the company;

(h) percentage of the total sales of the company;

(i) total of said number of customers for all such entries;

(j) total of said value of total sales for all such entries;

(k) total of said number of orders for all such entries;

(l) overall average of said average size of said orders for all such entries;

(m) overall average of said average of said orders per customer for all such entries;

(n) percentage total of percentage total customers of the company for all such entries;

(o) percentage total of percentage sales of the company for all such entries.

4. A method for making and organizing a sales territory plan as set forth in claim 3 wherein each customer of said sales account category is selectively ranked from best to least using user defined thresholds of said percentage total of the total sales of the company.

5. A method for making and organizing a sales territory plan as set forth in claim 1 wherein said sales territory dashboard comprises the following as associated with accounts categorized by industry:

(i) number of customers;

(ii) monetary value of total sales;

(iii) number of orders;

(iv) average size of said orders;

(v) average of said orders per customer;

(vi) percentage of the total customers of the company;

(vii) percentage of the total sales of the company;

(viii) total of said number of customers for all such entries;

(ix) total of said value of total sales for all such entries;

(x) total of said number of orders for all such entries;

(xi) overall average of said average size of said orders for all such entries;

(xii) overall average of said average of said orders per customer for all such entries;

(xiii) percentage total of percentage total customers of the company for all such entries;

(xiv) percentage total of percentage sales of the company for all such entries.

6. A method for making and organizing a sales territory plan as set forth in claim 1 wherein said sales territory dashboard comprises the following as associated with accounts categorized by products and services of the company:

(i) number of customers;

(ii) monetary value of total sales;

(iii) number of orders;

(iv) average size of said orders;

(v) average of said orders per customer;

(vi) total of said number of customers for all such entries;

(vii) total of said value of total sales for all such entries;

(viii) total of said number of orders for all such entries;

(ix) overall average of said average size of said orders for all such entries;

(x) overall average of said average of said orders per customer for all such entries.

7. A method for making and organizing a sales territory plan as set forth in claim 1 wherein said company sales channels consist of one or more of the group consisting of number of customers, monetary value of total sales, number of orders, average size of said orders, average of said orders per customer, total of said number of customers for all such entries, total of said value of total sales for all such entries, total of said number of orders for al such entries, overall average of said average size of said orders for all such entries, and overall average of said average of said orders per customer for all such entries.

8. A method for making and organizing a sales territory plan as set forth in claim 1 further including the step of executing said sales territory plan by the steps of:

a. using a goal tracking worksheet for tracking progress in meeting said sales and said compensation goals as listed in said goals summary sheet, and b. using a territory plan review form for visually presenting goals and goal tracking of said sales territory plan over a finite, selected period of time by the user of said plan review.

9. A method for making and organizing a sales territory plan as set forth in claim 1 wherein said goal setting questionnaire further compiles one or more items representing the compensation objectives of said company selected from the group consisting of:

(a) anticipated compensation of the following items: base salary for selected year, total compensation goal for said selected year, total compensation goal from a year prior to said selected year, percentage representing average commission rate for said selected year, percentage representing average commission rate for said prior year, monetary value representing the amount of business necessary to satisfy said total compensation goal for said selected year, monetary value representing an amount of business forecasted from existing clients, said forecast being calculated by multiplying said total compensation goal for said selected year times said average commission rate;

(b) percentage of business forecasted to be brought in said selected year from existing clients and percentage of business to be brought in this year from new clients, wherein sum of percentage of business forecasted to be brought in this year from existing clients and percentage of business to be brought in this year from new clients does not exceed one hundred percent;

(c) monetary value representing amount of business to be brought in from new clients, calculated from said monetary value representing the amount of business needed to be brought in order to meet said total compensation goal for this year less that of said monetary value representing the amount of business forecasted to be brought in, from existing clients, (d) total number of appointments with clients required to secure said one new client, wherein said sale actually occurs;

(e) percentage representing success rate of appointments with said prospective clients resulting in a sale, calculated by one divided by said total number of appointments with clients to secure said one new clients, wherein said sale actually occurs, multiplied by one-hundred to derive said percentage representing success rate of appointments;

(f) monetary value representing average order size for said existing customers for this year;

(g) monetary value representing average order size for said existing customers for previous year;

(h) number of orders placed by said existing clients for this year;

(i) number of orders placed by said existing clients for the previous year;

(j) monetary value representing average sale size for new sales accounts for this year;

(k) monetary value representing average sale size for new sales accounts for the previous year, and (l) number of orders new clients place each year.

10. A method for making and organizing a sales territory plan as set forth in claim 1 wherein said goal setting questionnaire further compiles one or more items representing the compensation objectives of said company selected from the group further consisting of:

(a) a goals summary sheet representing activities to be completed and frequency of said activities to meet said sales and compensation goals, including income compensation goal within a certain time period;

(b) a first activity goal representing desired number of contacts to said prospective clients within a certain time period, comprising: number of contacts to said prospective clients, monetary value per said contact calculated by projected sales for said time period divided by said number of said contacts;

(c) a second activity goal representing desired number of appointments to said prospective clients within a certain time period, comprising one or more factors selected from the group consisting of the number of existing customer appointments, number of new customer follow-up appointments, number of new customer first appointments, and the sum total of said existing customer appointments, said new customer follow-up appointments, said new customer first appointments;

(d) a first productivity goal representing desired number of customers in which there is a sale within a second time period, comprising one or more factors selected from the group consisting: number of existing customers where there is a sale, number of new customers in which there is a sale, sum total of said number of existing customers where there is a sale and number of new customers in which there is a sale;

(e) a second productivity goal representing desired number of customers wherein a sale occurs during the sales transaction within a selected time period, comprising one or more factors selected from the group consisting: number of sales orders from said existing clients, number of sales orders from said new clients, sum total of number of sales orders from said existing clients and said number of sales orders from said new clients; and (f) a third productivity goal representing desired monetary value of sales revenue within a selected time period, comprising one or more factors selected from the group consisting one or more factors selected from the group consisting of: monetary value of desired sales revenue from said existing clients, monetary value of desired sales revenue from said new clients, sum of said monetary value of desired sales revenue from said existing clients and monetary value of desired sales revenue from said new clients, total of said monetary value of desired sales revenue from said existing clients, said monetary value of desired sales revenue from said new clients, and said sum of said monetary value of desired sales revenue from said existing clients and monetary value of desired sales revenue from said new clients.

11. A method for making and organizing a sales territory plan as set forth in claim 1 further including a step of developing additional said tactical sales action plans by adding more sales tactics by using a targeted account report, wherein said targeted account report comprises one or more pieces of the information selected from the group consisting: name of sales account, associated strategy for said sales account; next scheduled action for said sales account; results from use of said associated strategy for said sales account; and notes related to said sales account.

12. A method for making and organizing a sales territory plan as set forth in claim 1 further comprising the steps of
a. creating a list of targeted sales accounts based upon salesperson selected strategies, wherein said strategy includes increasing the average sale prices, average number of orders per customer, number of customers, or a combination thereof
b. identifying competitors by their strengths and weaknesses, and
c. using said information from substeps a and b to apply a sales methodology to manage sales opportunities, relationships, or both.

13. A method for making and organizing a sales territory plan as set forth in claim 1 wherein said sales territory dashboard trends and relationships are established by quantifying said items by the highest, lowest, average or a combination thereof, wherein said items include customer orders for products, services or both; account orders; channel segment orders; or averages thereof.

14. A method for making and organizing a sales territory plan as set forth in claim 1 wherein said strategy summary includes increasing average order size, cross-selling additional products to existing customers, selling new products to new or existing customers.

15. A method for making and organizing a sales territory plan as set forth in claim 1 wherein said sales campaign analysis includes one or more of the following items: name of campaign, description of said campaign, owner of said campaign, target markets of said campaign, sources of said campaign, number of contacts of said campaign, primary contact of said campaign, problem or business issue, and qualifying questions
   wherein said campaign is based upon said information represented within one of said segmenting accounts by sales, said segmenting accounts by industry, said segmenting accounts by account type, said segmenting the products and services of the company, said segmenting sales channels of the company, or a functional equivalent thereof.

16. A method for making and organizing a sales territory plan as set forth in claim 8 wherein said goal tracking worksheet comprises one or more of the following:
   (a) said commission income goal on a monthly basis;
   (b) actual commission earned at the present date on a monthly basis;
   (c) percent of said commission income goal achieved on a monthly basis, determined by dividing said commission income goal on a monthly basis by said actual commission earned at the present date on a monthly basis, multiplying resultant figure by one-hundred to yield said percent;
   (d) said desired number of phone calls to said prospective clients on a monthly basis, actual number of phone calls to said prospective clients on a monthly basis;
   (e) said monetary value per phone call to said prospective clients, actual value per phone call generated by sales revenue resulting from each phone call, wherein said actual value per phone call is an overall average;
   (f) percent of goal achieved of said monetary value per phone call to said prospective clients on a monthly basis, determined by dividing said monetary value per phone call to said prospective clients by said actual value per phone call generated by sales revenue resulting from each phone call, multiplying resultant figure by one-hundred to yield said percent;
   (g) said number of existing customer appointments on a monthly basis;
   (h) actual number of existing customer appointments on a monthly basis;
   (i) percent of customer appointments goal achieved on a monthly basis, said number of existing customer appointments on a monthly basis divided by said actual number of existing customer appointments on a monthly basis;
   (j) said number of new customer follow-up appointments on a monthly basis;
   (k) actual number of new customer follow-up appointments on a monthly basis;
   (l) percent of new customer follow-up appointments goal achieved on a monthly basis, said number of new customer follow-up appointments on a monthly basis divided by actual number of new customer follow-up appointments on a monthly basis;
   (m) said number of new customer first appointments on a monthly basis;
   (n) actual number of new customer first appointments on a monthly basis;
   (o) percent of new customer first appointments goal achieved on a monthly basis, said number of new customer first appointments on a monthly basis divided by said actual number of new customer first appointments on a monthly basis;
   (p) sum total of said number of existing customer appointments on a monthly basis, said number of new customer follow-up appointments on a monthly basis, and said number of new customer first appointments on a monthly basis;
   (q) sum total of said actual number of existing customer appointments on a monthly basis, said actual number of new customer follow-up appointments on a monthly basis, and said actual number of new customer first appointments on a monthly basis;
   (r) sum total of said percent of customer appointments goal achieved on a monthly basis, said percent of new customer follow-up appointments goal achieved on a monthly basis, and said percent of new customer first appointments goal achieved on a monthly basis;
   (s) said number of existing customers in which where there is a sale on a monthly basis;
   (t) actual number of existing customers in which where there is a sale on a monthly basis;
   (u) percent of number of existing customers in which where there is a sale on a monthly basis calculated by dividing said number of existing customers in which where there is a sale on a monthly basis by said actual number of existing customers in which where there is a sale on a monthly basis, multiplying resultant figure by one-hundred to yield said percent;
   (v) said number of new customers in which where there is a sale on a monthly basis,
   (w) actual number of new customers in which where there is a sale on a monthly basis;
   (x) percent of number of new customers in which where there is a sale on a monthly basis calculated by dividing said number of new customers in which where there is a sale on a monthly basis by said actual number of new customers in which where there is a sale on a monthly basis, multiplying resultant figure by one-hundred to yield said percent;
   (y) sum total of said number of existing customers in which where there is a sale on a monthly basis and said number of new customers in which where there is a sale on a monthly basis;
   (z) sum total of said actual number of existing customers in which where there is a sale on a monthly basis and said actual number of new customers in which where there is a sale on a monthly basis;
   (aa) sum total of said percent of number of existing customers in which where there is a sale on a monthly basis and said percent of number of new customers in which where there is a sale on a monthly basis;
   (bb) said monetary value of desired sales revenue from existing clients on a monthly basis;
   (cc) actual monetary value of desired sales revenue from existing clients on a monthly basis;
   (dd) percent of monetary value of desired sales revenue goal achieved from existing clients on a monthly basis, calculated by dividing said monetary value of desired sales revenue from existing clients on a monthly basis by said actual monetary value of desired sales revenue from existing clients on a monthly basis, multiplying resultant figure by one-hundred to yield said percent;

(eed) said monetary value of desired sales revenue from new clients on a monthly basis;
(ff) actual monetary value of desired sales revenue from new clients on a monthly basis;
(gg) percent of monetary value of desired sales revenue goal achieved from new clients on a monthly basis calculated by dividing said monetary value of desired sales revenue from new clients on a monthly basis by said actual monetary value of desired sales revenue from existing clients on a monthly basis, multiplying resultant figure by one-hundred to yield said percent;
(hh) sum total of said monetary value of desired sales revenue from existing clients on a monthly basis and said monetary value of desired sales revenue from new clients on a monthly basis;
(ii) sum total of said actual monetary value of desired sales revenue from existing clients on a monthly basis and said actual monetary value of desired sales revenue from new clients on a monthly basis;
(jj) sum total of said percent of monetary value of desired sales revenue goal achieved from existing clients on a monthly basis and said percent of monetary value of desired sales revenue goal achieved from new clients on a monthly basis;
(kk) said number of desired sales orders from said existing clients on a monthly basis;
(ll) actual number of desired sales orders from said existing clients on a monthly basis;
(mm) percentage of desired sales orders achieved on a monthly basis calculated by dividing said number of desired sales orders from said existing clients on a monthly basis by said actual number of desired sales orders from said existing clients on a monthly basis, multiplying resultant figure by one-hundred to yield said percent;
(nn) said number of desired sales orders from said new clients on a monthly basis;
(oo) actual number of desired sales orders from said new clients on a monthly basis;
(pp) percentage of desired sales orders achieved on a monthly basis calculated by dividing said number of desired sales orders from said new clients on a monthly basis by said actual number of desired sales orders from said new clients on a monthly basis, multiplying resultant figure by one-hundred to yield said percent;
(qq) sum total of said number of desired sales orders from said existing clients on a monthly basis and said number of desired sales orders from said new clients on a monthly basis;
(rr) sum total of said actual number of desired sales orders from said existing clients on a monthly basis and said actual number of desired sales orders from said new clients on a monthly basis, and
(ss) sum total of said percentage of desired sales orders achieved on a monthly basis and said percentage of desired sales orders achieved on a monthly basis.

17. A method for making and organizing a sales territory plan as set forth in claim 8 wherein said territory plan review form comprises:

(a) review of said sales territory plan by sales manager before the start of execution of said sales territory plan,
(b) review of said sales territory plan by at least one of said sales territory representatives before the start of execution of said sales territory plan;
(c) date of initial review of said sales territory plan by sales manager;
(d) date of initial review of said sales territory plan by at least one of said sales territory representatives;
(e) at least a first review of said sales territory plan by sales manager before the start of execution of said sales territory plan;
(f) at least a first review of said sales territory plan by at least one of said sales territory representatives before the start of execution of said sales territory plan;
(g) date of first or subsequent review of said sales territory plan by sales manager;
(h) date of first or subsequent review of said sales territory plan by at least one of said sales territory representatives;
(i) a user defined income goal as determined by a user selected, finite period of time;
(j) a periodic forecast as related to achieving said user defined income goal, wherein said periodic forecast is calculated for a time span which is less than said user selected, finite period of time, such that there is at least a first periodic forecast and a second periodic forecast;
(k) a strategy goals and results table which comprises one or more of the following: description of strategy, sales goal, actual sales, percent of goal, comments, and adjustments.

18. A method for making and organizing a sales territory plan as set forth in claim 17 wherein said periodic forecast comprises:

a. unique identifier for each individual said periodic forecast
b. time frame pertaining to said periodic forecast as defined by the number of months within said time frame divided by twelve,
c. percentage of said user defined income goal projected to be met within time frame pertaining to said periodic forecast
d. monetary goal within said time frame pertaining to said periodic forecast
e. actual sales income generated within said time frame pertaining to said periodic forecast
f. percentage of goal pertaining to said periodic forecast, calculated by dividing said monetary goal within said time frame pertaining to said periodic forecast by said actual sales income generated within said time frame pertaining to said periodic forecast, multiplying resultant figure by one-hundred to yield said percent
g. sum total of said percentage of said user defined income goal projected to be met within time frame pertaining to said periodic forecast, said monetary goal within said time frame pertaining to said periodic forecast, said actual sales income generated within said time frame pertaining to said periodic forecast, and said percentage of goal pertaining to said periodic forecast.

* * * * *